(12) United States Patent
Merced et al.

(10) Patent No.: US 12,262,093 B2
(45) Date of Patent: *Mar. 25, 2025

(54) SYSTEMS AND METHODS FOR PROVIDING A PROGRESS BAR FOR UPDATING VIEWING STATUS OF PREVIOUSLY VIEWED CONTENT

(71) Applicant: Adeia Guides Inc., San Jose, CA (US)

(72) Inventors: Angel Merced, Wayne, PA (US); Krista Ramirez, Ardmore, PA (US); Todd Dietz, North Wales, PA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/866,828

(22) Filed: Jul. 18, 2022

(65) Prior Publication Data

US 2023/0083324 A1 Mar. 16, 2023

Related U.S. Application Data

(63) Continuation of application No. 15/850,488, filed on Dec. 21, 2017, now Pat. No. 11,451,874.

(51) Int. Cl.
*H04N 21/466* (2011.01)
*H04N 21/431* (2011.01)
(Continued)

(52) U.S. Cl.
CPC ..... *H04N 21/4826* (2013.01); *H04N 21/4314* (2013.01); *H04N 21/4316* (2013.01); *H04N 21/4355* (2013.01); *H04N 21/4383* (2013.01); *H04N 21/4532* (2013.01); *H04N 21/4668* (2013.01); *H04N 21/4788* (2013.01);
(Continued)

(58) Field of Classification Search
CPC ........... H04N 21/4826; H04N 21/4316; H04N 21/4355; H04N 21/4383; H04N 21/4532; H04N 21/4668; H04N 21/4788; H04N 21/8133; H04N 21/8547; H04L 67/306
See application file for complete search history.

(56) References Cited

U.S. PATENT DOCUMENTS 6,239,794 B1 5/2001 Yuen et al.
6,564,378 B1 5/2003 Satterfield et al.
(Continued)

FOREIGN PATENT DOCUMENTS

EP 1528566 A2 5/2005
EP 2605528 A1 6/2013
(Continued)

OTHER PUBLICATIONS

International Search Report and Written Opinion dated Nov. 12, 2018 in PCT/US2018/039438.

*Primary Examiner* — Mulugeta Mengesha
(74) *Attorney, Agent, or Firm* — Haley Guiliano LLP

(57) ABSTRACT

Systems and methods are provided for providing information about events occurring in media content that was previously accessed. A display of a progress bar including segments for the events in the previously accessed content is provided in the screen view of current media being accessed. The progress bar segments may be selected to access the content. Upon conclusion of the content, an image and text about the content may be supplied to the viewer to post on social media about the content.

24 Claims, 12 Drawing Sheets

(51) Int. Cl.
*H04N 21/435* (2011.01)
*H04N 21/438* (2011.01)
*H04N 21/45* (2011.01)
*H04N 21/4788* (2011.01)
*H04N 21/482* (2011.01)
*H04N 21/81* (2011.01)
*H04N 21/845* (2011.01)
*H04N 21/8547* (2011.01)
*H04L 67/306* (2022.01)
*H04N 21/4722* (2011.01)

(52) U.S. Cl.
CPC ..... *H04N 21/8133* (2013.01); *H04N 21/8456* (2013.01); *H04N 21/8547* (2013.01); *H04L 67/306* (2013.01); *H04N 21/4722* (2013.01)

(56) References Cited

U.S. PATENT DOCUMENTS

| | | | |
|---|---|---|---|
| 7,165,098 | B1 | 1/2007 | Boyer et al. |
| 7,458,093 | B2 | 11/2008 | Dukes et al. |
| 7,761,892 | B2 | 7/2010 | Ellis et al. |
| 8,046,801 | B2 | 10/2011 | Ellis et al. |
| 9,432,739 | B2 * | 8/2016 | Kim ..................... H04N 21/472 |
| 11,451,874 | B2 | 9/2022 | Merced et al. |
| 2002/0174430 | A1 | 11/2002 | Ellis et al. |
| 2003/0093790 | A1 | 5/2003 | Logan et al. |
| 2004/0255336 | A1 | 12/2004 | Logan et al. |
| 2005/0086688 | A1 * | 4/2005 | Omoigui ............ H04N 21/4143 725/35 |
| 2005/0251827 | A1 | 11/2005 | Ellis et al. |
| 2008/0062318 | A1 | 3/2008 | Ellis et al. |
| 2008/0127275 | A1 | 5/2008 | Tang et al. |
| 2009/0154898 | A1 | 6/2009 | Barrett et al. |
| 2010/0153885 | A1 | 6/2010 | Yates |
| 2013/0166639 | A1 | 6/2013 | Shaffer et al. |
| 2013/0173710 | A1 | 7/2013 | Seo |
| 2014/0282745 | A1 * | 9/2014 | Chipman ......... H04N 21/47214 725/61 |
| 2015/0181301 | A1 | 6/2015 | Bloch et al. |
| 2016/0182924 | A1 | 6/2016 | Todd |
| 2016/0255409 | A1 * | 9/2016 | Feldstein ........... H04N 21/8455 725/40 |
| 2017/0064396 | A1 * | 3/2017 | Yun ................... H04N 21/4826 |
| 2017/0085941 | A1 | 3/2017 | Gupta et al. |
| 2018/0199080 | A1 | 7/2018 | Jackson et al. |
| 2018/0227624 | A1 * | 8/2018 | Bae .................. H04N 21/44224 |
| 2018/0249219 | A1 * | 8/2018 | Depies ................ H04N 21/814 |
| 2019/0200090 | A1 | 6/2019 | Merced et al. |

FOREIGN PATENT DOCUMENTS

| | | |
|---|---|---|
| EP | 2611204 A1 | 7/2013 |
| JP | 2005250738 A | 9/2005 |
| JP | 2006246063 A | 9/2006 |
| JP | 2007208651 A | 8/2007 |
| JP | 2008072571 A | 3/2008 |
| JP | 2008124881 A | 5/2008 |
| JP | 2009060551 A | 3/2009 |
| JP | 2016521387 A | 7/2016 |
| KR | 20130083056 A | 7/2013 |
| WO | 2017053532 A1 | 3/2017 |

* cited by examiner

100

200

1300

1305 — Access with Control Circuitry, First Content with User Equipment

1310 — Instruct the User Equipment to Access Second Content Instead of the First Content, Wherein the Second Content is Accessed at a First Progression Point in the First Content

1315 — While the Second Content is Being Accessed, Monitor with Control Circuitry Metadata Associated with the First Content for a Plurality of Events that are Associated with Respective Timestamps that Follow the First Progression Point

1320 — In Response to Detect an Event of the Plurality of Events in the First Content, Store Information Identify the Event in a List of Segments of the First Content that Follow the First Progression Point

1325 — Generate with Control Circuitry for Display on the User Equipment, a Simultaneous Display of the Second Content and the List of Segments of the First Content that Follow the First Progression Point

1330 — Receive at the Control Circuitry, a User Selection of a First of the Segments in the List of the First Content

1335 — Retrieve Timestamps of the First Segment that Represent a Start Time and an End Time of the First Event in the First Content

1340 — Perform an Action Related to the Selected First Segment of the First Content Based on the Retrieved Timestamps

FIG. 13

SYSTEMS AND METHODS FOR PROVIDING A PROGRESS BAR FOR UPDATING VIEWING STATUS OF PREVIOUSLY VIEWED CONTENT

CROSS-REFERENCE TO RELATED APPLICATIONS

This application is a continuation of U.S. patent application Ser. No. 15/850,488, filed Dec. 21, 2017, the disclosure of which is hereby incorporated by reference herein in its entirety.

BACKGROUND

There are numerous types and sources of media content and it is increasingly difficult to find time to watch all of the interesting media that a viewer hears about. In addition, balancing viewing streaming media, as well as live content, each of which may be interrupted by advertisements and pop-up windows with options for interacting with the media, can make media consumption complicated and time consuming. Some viewers may also wish to participate in audience commentary or indicate that they are viewing certain media to make the media viewing experience more social. Simplifying the presentation of multiple content items so that a viewer can view highlights or certain portions of content may improve the viewer's ability to consume more interesting content in a limited time period.

SUMMARY

Accordingly, systems and methods are described for providing information about content that a viewer has accessed. In an example, a display is provided for a viewer including segments relating to content the viewer has accessed. A viewer may access, for example, media content, such as a sporting event. While the sporting event is playing, the viewer may wish to view other content, such as an episode of a television series. When the viewer accesses the other content (e.g., changes the channel to view the television series), a media guidance application running on user equipment may collect information about the sporting event that was previously viewed, to aggregate for display in the screen of the television series that the viewer is currently watching. The information about the sporting event may be displayed in a progress bar or other format so that it is relatively unobtrusive in the display screen of the television series. That is, rather than providing a split screen or picture-in-picture view of the previously viewed content, the viewer can watch a screen including a main display of media content with only a small portion of the display including highlights and update segments for the previously accessed content.

In an illustrative example, methods and systems are provided for identifying segments of previously accessed content. A viewer may access first content with user equipment. The first content may be any type of media content that may be obtained from any media source. In some scenarios, the first content may be a type of media that has some live or in the moment aspect that would make a viewer wish to view it at a particular time, such as a sporting event, or first run television episode. However, the first content can be any type of media. The user equipment used to access the content may be any type of user device capable of displaying a media item such as a television, tablet, computer, portable device, gaming device, set-top box, mobile device, mobile phone, etc. In general, such user equipment may be operated with a media guidance application to support media access and provide enhanced features and interactions with the media.

After the viewer has accessed the first content, the viewer may wish to view a second media content item and will instruct the user equipment via the media guidance application to access the second content instead of the first content. For example, the viewer may wish to stop watching the sports game and watch an episode of a television series instead. The media guidance application will receive the instruction to access the second content and will change the screen display to show the second content. The media guidance application will store information about the point in time (a first progression point) at which the user stopped watching the first content. The time for the first progression point in the first content may be stored in a cache by the media guidance application for use in generating a display of information about the first content.

The media guidance application may generate a simultaneous display of the second content and information identifying segments of the first content that follow the first progression point. Using the example above, in a display of the television episode, information about the sporting event, such as event highlights, milestones, etc., that occurred after the viewer stopped accessing the sporting event may be identified and shown in the screen. This arrangement allows a viewer to watch a television show while providing certain information about media that is known to be interesting to the viewer (because the viewer had accessed it) so that the viewer can keep track of events occurring in a sporting event.

The display of information segments may be provided in a manner such that the user can select the segments to cause an action related to the segment. The media guidance application may receive the viewer's selection of a first of the segments of the first content and the media guidance application will perform an action related to the selected first segment of the first content. For example, the viewer may use a touch screen on the display, a remote-control, or other input device to select one of the segments shown on the screen. The segments may be selected to perform some media operation related to the segment such as changing the channel or source input so that the viewer can view the first content, i.e., the sporting event at the time of the segment. Other actions can be to record the first content, resume the first content from the time the viewer stopped watching the sporting event, obtaining a link to the event occurring in the segment, viewing a clip of the segment event, or other action.

In another example, a system and method for identifying segments of previously accessed content may be provided by accessing with control circuitry, first content with user equipment. The first content may be any type of media content, such as a movie, television show, sporting event, reality show, episode of a television series, or other media content. The first content may be provided by any type of media source, such as television, subscription streaming service, Internet media source, or other media source, accessed using a media guidance application for delivery to a display screen of user equipment, such as a television screen or portable device. After the viewer has begun watching the first content, the viewer may wish to watch other media content, and will input instructions that are received by the media guidance application which instructs the user equipment to access the second content instead of the first content. In an example, a viewer may wish to watch one television show, but then changes to a second television show. In another example, a viewer may wish to view a sporting event, but then changes to a second sporting event or second television show. The viewer may still wish to keep track of the first show, and could, for example, manually return to the first show at commercial or other periodic breaks.

The time at which the second content is accessed is a first progression point in the first content. The time for the first progression point may be stored by the media guidance application to, for example, provide a starting point for highlighting following events in the first content for the viewer.

While the second content is being accessed by the viewer, i.e., while the viewer is watching the second television show, the media guidance application may monitor metadata associated with the first content. For example, the media guidance application may monitor metadata about the first content, such as a sporting event, using a sports feed from the content provider. In some scenarios, the media guidance application may monitor metadata about the first content from a third-party source, such as a media aggregator that provides commentary or live streams about content. In another example, the media guidance application may monitor social media networks for updates and events relating to media items.

The metadata monitoring performed by the media guidance application for the first content may include monitoring for metadata for events occurring in the first content. Such events may be associated with a respective timestamp that follow the first progression point. Thus, in the sporting event example, the media guidance application will monitor metadata for events occurring in the sporting event following the time when the viewer stopped accessing the sporting event and when the viewer started watching the second television show. Some examples of events in a sporting event could be related to points scored, penalties, half time shows, in addition, events could be moments that are tagged or posted in social media for the sporting event.

In response to detecting an event or multiple events in the first content, the media guidance application may store information identifying the event in a list of segments for the first content that follow the first progression point. Each event for the sporting event may be stored or cached in memory with a timestamp so that the media guidance application can list such events following the progression point. The timestamps can be used to order events in the display, etc.

The media guidance application may then generate for display on the user equipment, such as the viewers television or portable tablet, a simultaneous display of the second content and the list of segments of the first content that follow the first progression point. Thus, while the viewer is watching the second television show, the viewer can see a display in the same screen that includes a list of segments relating to the first content following when the viewer stopped watching the first content. Using the sporting event example, a viewer can switch from watching a sporting event to watching a television show, and while watching the show, the viewer can see in the display a list of events that are occurring in the sporting event since the viewer stopped watching the sporting event. Thus, the viewer can continue to watch the second show and see when events are occurring in the sporting event, e.g., when points are scored, or players come in or out, etc.

The list of events or segments from the first content may be selected by the viewer. When the media guidance application receives a user selection of a segment in the list of the first content, the media guidance application may retrieve timestamps for the selected segment that represent a start time and an end time of the associated event in the first content.

The media guidance application can perform an action related to the selected first segment of the first content based on the retrieved timestamps. For example, the media guidance application may use the retrieved timestamp information to identify the time and portion of the event that the viewer is interested in. Some types of actions that may be performed by the media guidance application in response to selection of the first segment may include, for example, recording the first segment, adding the selected segment to a watch list, sharing the first segment on a social network, generating a clip associated with the selected first segment, resuming the first content at the first progression point, and accessing the first content starting from the start time of the first segment.

In an illustrative example, a viewer watching a basketball game may choose to watch another television show but will keep tabs on the basketball game by way of a list displayed within the television show screen that includes segments for events related to the basketball game that occur after the viewer stopped watching the basketball game. If the viewer sees an interesting segment in the list, the viewer may select the segment and a media guidance application will determine timestamps for the beginning and end of the segment so that the media guidance application can deliver content or perform some action for the event for the viewer.

The segments included in the list may be populated using metadata or feed of information related to the first content. In some scenarios, the media guidance application will collect feedback about the first content and metadata for the first content to identify interesting segments for the first content. Ideally, the most interesting segments will be included in the display so that less interesting segments do not clutter the screen. Some more interesting segments may be highlighted in a particular manner to make them more distinctive for the viewer. For example, a list of segments may be related to certain events about a basketball game, perhaps points scored, and also a special play that is being discussed on social media. Such play may be highlighted in the list of segments. The more interesting segments may also have associated additional interaction options. For example, for a special play trending on Twitter, there may be an option to access the Twitter stream about the play. There may also be a way to capture the event and link to the content on the viewer's social media. Other additional interaction options could also be provided for interesting events.

The media guidance application may also use the viewer's user profile to identify segments that may be more relevant to the viewer. In particular, the media guidance application may compare each segment in the list of segments about the first content to the user's profile and then any matching or related segments may be displayed in the list in a visually distinctive manner. In an example relating to the basketball game, a viewer may have a fantasy basketball team that is stored in the user profile. If the basketball game includes players from the viewers fantasy team, any segment items related to the viewer's fantasy players may be shown in a distinctive manner. In this way, the viewer may be able to access content actions for team players.

In another example, a type of events in the segments may be determined by the media guidance application based on metadata for the respective event. The media guidance application may compare the event type with the viewer's user profile. Any events having an event type that matches the user profile may be selected by the media guidance application to include in the list of segments. As an example, a viewer may enjoy watching halftime shows in sporting events. In the basketball game example, the halftime show may be a matching event that may be selected for inclusion in the segment list because it matches with information in the user profile. Of course, the halftime show could also be included in the segment list because it is trending on social media, or for other reasons.

In another example, while the viewer is accessing the second content, such as a television show, the media guidance application may monitor metadata for the first content for an event or events that have respective timestamps after the first progression point, i.e., events that occur after the viewer stopped accessing the first content.

In an example, a viewer may watch or access the second content and see an interesting segment in the list of segments for the first content. If the viewer selects the interesting segment, the media guidance application may generate for display within the screen of the second content, a picture-in-picture display of the first content at a time corresponding to a timestamp for the selected first segment. The display may also include a display of the list of segments for the first content that follow the timestamp for the selected segment. In some scenarios, a second list of segments for the second content that follows a timestamp associated with the selection of the first segment may also be included in the display. Thus, the viewer can watch a small display of an event occurring in the first content within the screen of the second content. In case the viewer is focused on the first content event in the picture-in-picture display, a progress bar indicating events in the second content may also be included in the display so the viewer can see what he or she may have missed.

In some examples, the media guidance application may store information about events, segments, and respective timestamps in a cache or memory when, for example, the media guidance application is monitoring metadata and determining which events to include in the segment list. The media guidance application may also store links to additional content that is related to the respective segments for the first content. Such links may be stored to provide ready access to the content should the user wish to access it.

In another example, a viewer may wish to share that they have watched or accessed some media. For example, the viewer may wish to share it on social media. To assist the viewer with sharing this information, the media guidance application may identify, with control circuitry, an image associated with the second content. When the second content has concluded, for example, when the viewer has finished accessing or watching the second content, the media guidance application may present to the user the image associated with the second content. The media guidance application may also present the image including textual commentary associated with the image. The viewer may wish to post the image and textual commentary to social media and the media guidance application may receive a selection by the user of an option to post the image and the textual commentary associated with the image. In response to this selection, the media guidance application may transmit to a social network a communication that includes the image and the textual commentary.

The media guidance application may identify the image for posting to the social network for the user by searching an image database for images associated with the second content. The image database can be a media focused database or a database that includes any type of images. The media guidance application may analyze information about each of the respective images. The information about the respective images can be, for example, metadata about the image that indicates a source or use of the image. The media guidance application may use the information about the images to determine a popularity of the respective images and select an image that is the most popular. For example, an image that appears in multiple image databases or that is used in social networks may be deemed more popular.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIGS. 12-13 are flowcharts of illustrative processes for generating a progress bar of recently viewed media content in accordance with some embodiments of the disclosure;

DETAILED DESCRIPTION

Accordingly, systems and methods are described herein for enhancing a viewer's media consumption experience. In particular, for a viewer interested in more than one media item, the viewer may view one media content item, then switch to a second media content item. A media guidance application may detect the viewer's switch from the one media item to the second media item and can monitor the media item that is no longer being viewed and present information about that media item to the viewer. For example, a viewer may access a sporting event and then change to accessing another media item, such as a television show. The media guidance application may monitor the progress of the sporting event after the viewer has stopped accessing the event. Highlights or events from the sporting event may be identified by the media guidance application and information about such events may be presented to the viewer in a progress bar display in the screen of the television show that the viewer is watching. Thus, the user may be able to view the television show while keeping an eye on details about the sporting event that the viewer is missing. In some scenarios, it may be helpful for the progress bar to be relatively small and the information in the progress bar limited to only the most relevant information for the viewer so that the viewer is not distracted by a lot of uninteresting information. In other scenarios, the user may wish to have a lot of information in the progress bar so that the user does not miss anything in the sporting event. Such preferences may be included in the user's user profile.

Figure 1:
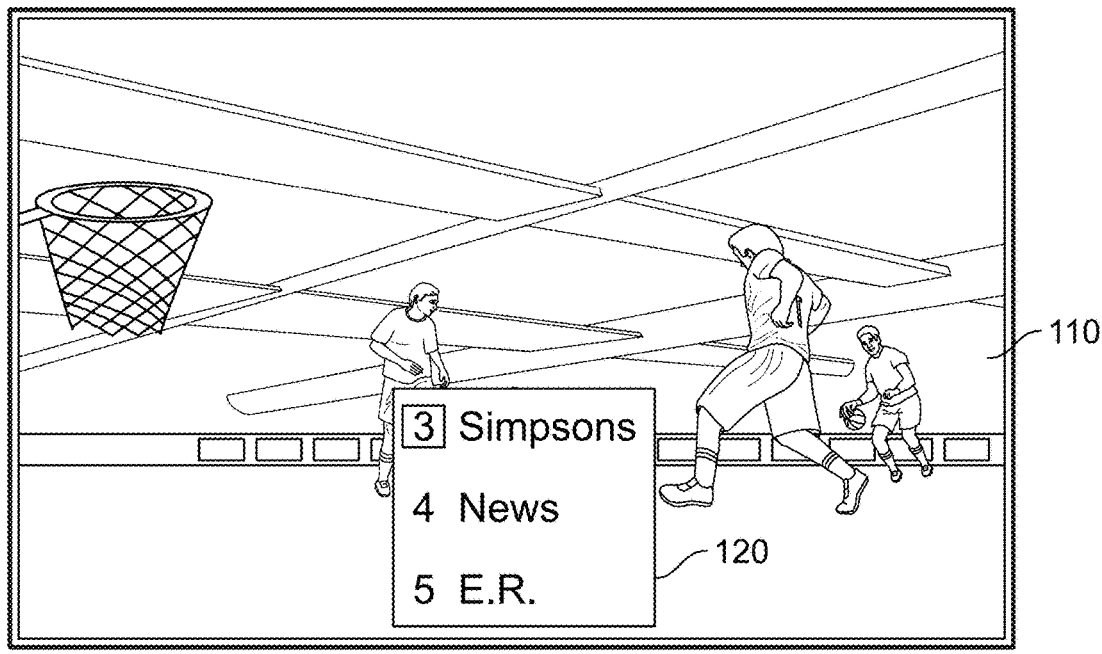
FIG. 1 shows an illustrative example of media content being displayed in a screen generated by a media guidance application in accordance with some embodiments of the disclosure.
Figure 2:
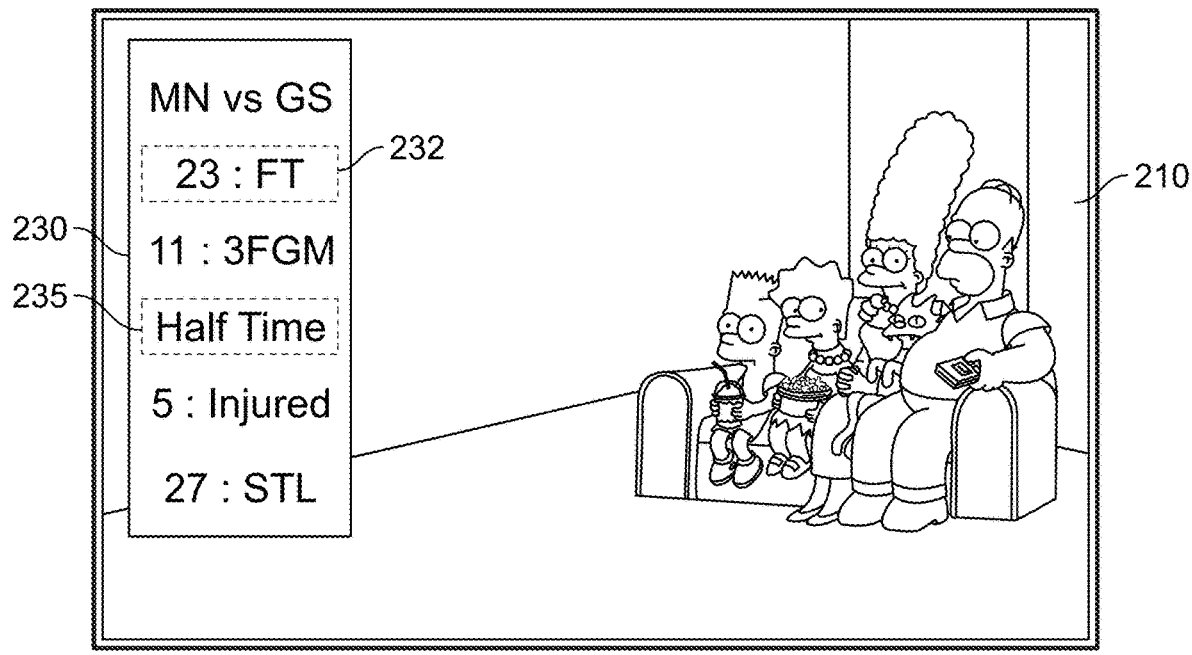
FIG. 2 shows another illustrative example of media content being displayed with information about other media content in a screen generated by a media guidance application in accordance with some embodiments of the disclosure.

Turning to FIG. 1, a viewer may access an item of media content, such as a basketball game as shown in screen 100. The screen 100 may be any type of electronic display screen that is capable of displaying media. For example, screen 100 may be a television, computer, portable device, tablet, or other screen device. The basketball game 110 may be provided by a media guidance application capable of generating media content for display on the screen 100 and may be delivered using a media source, such as a streaming sports channel service, a television channel, cable television service, Internet based media sources, or other source. After the viewer has accessed the basketball game, the viewer may wish to access another media item and a media guidance screen 120 may be used to identify another media item to view. If the viewer selects the Simpsons from the media guidance screen 120, the viewer may access the Simpsons, as shown in FIG. 2. Whether the viewer has watched the basketball game for a short or long period of time, the media guidance application will detect that the viewer has stopped accessing the basketball game and can continue monitoring the basketball game while the viewer is accessing the new media item.

Turning to FIG. 2, in response to receiving a selection of another media item—e.g., the Simpsons from the media guidance screen 120 in FIG. 1, the media guidance application may generate a display 200 of the new media item which includes the television program the Simpsons 210. The television program 210 may be depicted with a simultaneous display of a progress bar 230 that includes details about the basketball game that the viewer had previously accessed. When the viewer initially accesses the second content, there may not have been any missed noteworthy events in the basketball game to include in the progress bar 230. There could be a delay in displaying a progress bar 230 until there are suitable events to display, or the progress bar 230 can be displayed with some minimum amount of information such as a title of the content item, and in this example, the teams playing and the current score. Although the progress bar 230 is depicted in a vertical position on the left of the screen 200, the progress bar 230 may be located in any suitable place on the screen 200, such as along the bottom or top of the screen, and may be moved or have its size and shape altered by the viewer. In some arrangements, the shape, size and location may be altered based on the contents in the progress bar. The progress bar 230 may include event information about the progress of the basketball game, i.e., the previously accessed content.

The information included in the progress bar 230 may be selected by the media guidance application from event information for the basketball game that is being monitored by the media guidance application. The media guidance application may monitor a stream of sports information from, for example, the media source of the basketball game that was previously accessed by the user, or a sports feed for the NBA, or other source. In addition, the media guidance application may monitor third-party sources and social media for information about the game. Thus, the media guidance application can select various pieces of information to include in the progress bar 230 that may be suitable for the viewer. For example, as shown, the progress bar 230 may include information about plays, e.g., that player 23 has made a free throw 232, that player 11 has made a three-point field goal, and player 27 has made a steal. These types of information may be obtained from a sports feed for the game. Some of these items may be selected to include in the progress bar 230 because they may have some particular relevance to the viewer. For example, player 23 may be a favorite of the viewer's, or perhaps player 23 is on the viewer's fantasy team. Such information can be gleaned from the viewer's user profile, and used by the media guidance application to select relevant information to include in the progress bar. In addition, the progress bar 230 may include other information, such as a halftime show 235 and that player 5 was injured. Such information may be obtained from the sports feed, or from social media or other source that may be commenting on such events that are occurring in the game.

Any of the items included in the progress bar 230 may be selected by the viewer and an action related to the selected item may be performed by the media guidance application. For example, a viewer may select the item 232 to view a clip of player 23 making a free throw, or to return to the basketball game at the time player 23 is making the free throw shot. In general, the segment items shown in progress bar 230 may be presented following the time the viewer ceased accessing the basketball game. In addition, the segment items in progress bar 230 may change as time elapses and there are more events occurring in the basketball game. Some of the segments in progress bar 230 may be depicted in a distinctive manner so that the viewer knows that they may be particularly relevant to the viewer. For example, item 232 may be highlighted because player 23 is a favorite of the viewer's, and item 235 may be highlighted because the halftime show includes a favorite performer of the viewer. Such favorite information may be obtained from the viewer's user profile. In addition, segments may be highlighted because they are determined to be interesting or popular, for example, based on treatment by commentators or in social media. The segments included in progress bar 230 may be obtained from metadata about the previously accessed media and may be associated with a timestamp so that if the segment is selected, the media guidance application can determine a time interval of the media to display for the viewer of the selected segment.

Figure 3:
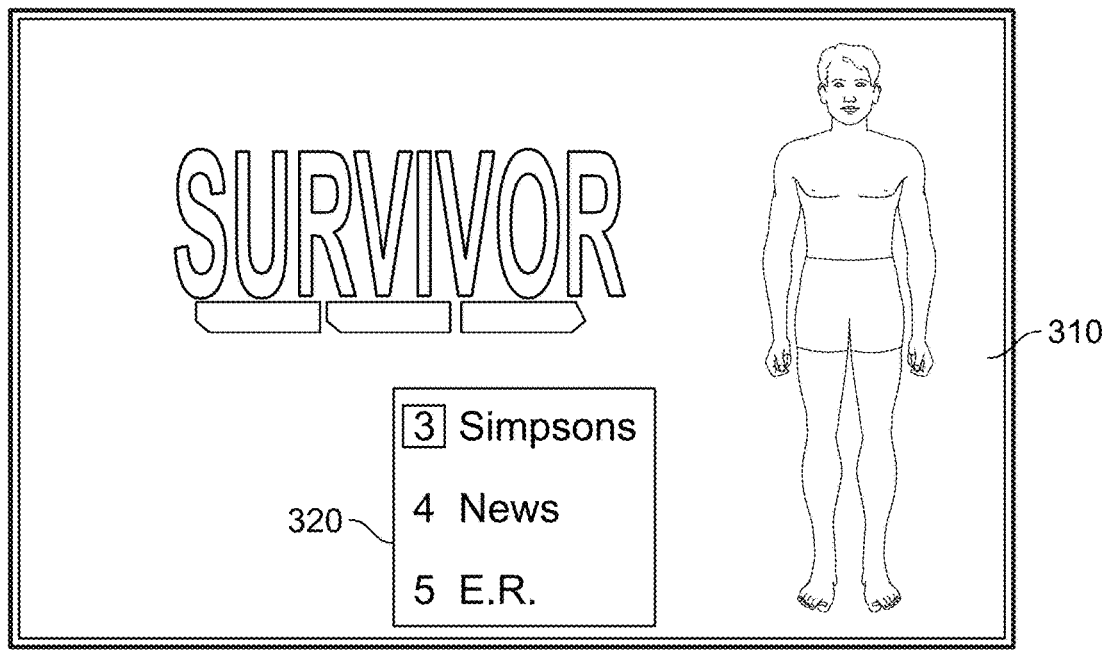
FIG. 3 shows another illustrative example of media content being displayed in a screen generated by a media guidance application in accordance with some embodiments of the disclosure.

In another example, turning to FIG. 3, a viewer may wish to view a reality show—Survivor. As shown in screen 300, the viewer may access an episode of a television series Survivor 310. The episode of Survivor may be provided by a streaming service or television channel for the viewer. The viewer may then select a media guidance window 320 to choose another media content. A selection of, for example, the Simpsons from the media guidance window 320 may be received by the media guidance application, and in response, the media guidance application will cease presenting the Survivor episode from FIG. 3, and generate the screen shown in FIG. 4.

Figure 4:
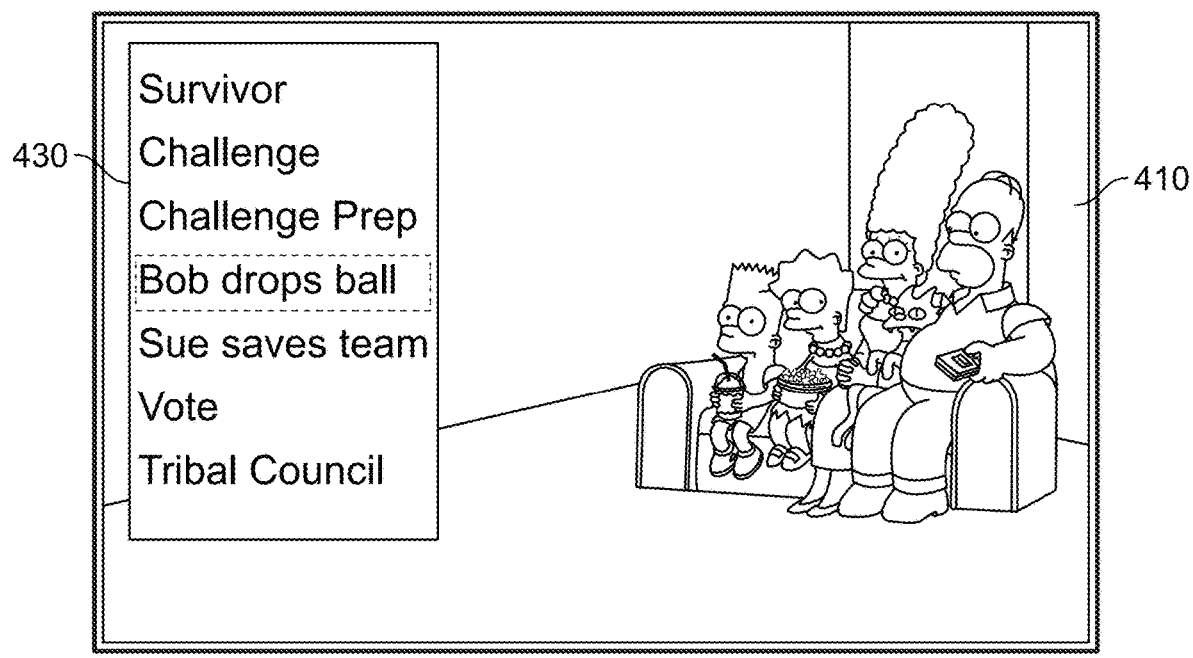
FIG. 4 shows another illustrative example of media content being displayed with information about other media content in a screen generated by a media guidance application in accordance with some embodiments of the disclosure.

FIG. 4 depicts a screen 400 that includes another media item—the Simpsons 410 which may be presented with a progress bar 430 that includes details about the Survivor episode that the user is no longer viewing. Although progress bar 430 is depicted including multiple segments of information about the episode, such information may not be immediately displayed when the viewer first accesses the Simpsons because nothing has occurred in the Survivor episode in the time it took to change the screen display from Survivor to the Simpsons. Progress bar 430 may include information about the previously accessed media—the Survivor episode, from the time the viewer has stopped accessing the media. The segments included in progress bar 430 may be obtained from metadata about the previously accessed media and may be associated with a timestamp so that if the segment is selected, the media guidance application can determine a time interval of the media to display for the viewer of the selected segment. Some of the segments shown in progress bar 430 may be highlighted in a distinctive manner to indicate that they be particularly interesting to the viewer. As shown in FIG. 4, a segment "Bob drops ball" is shown highlighted. The media guidance application may monitor metadata about the previously accessed media content to identify segments that the user may be interested in. In addition, the media guidance application may monitor social media and third-party treatment of the previously accessed media content to identify popular or interesting events. In this case, the media guidance application may have detected an event in the previously accessed episode of Survivor where Bob drops a ball that has been posted or commented upon in social media. Alternatively, the media guidance application may have detected that the viewer has some interest or connection to Bob from the user's user profile. Either of these possibilities, or the combination thereof, may cause the media guidance application to present the segment in a distinctive manner for the viewer.

In some scenarios, particularly for media content that is not a first run show or live event, there may be metadata about the media content that would be suitable for a progress bar. In this case, the media guidance application may populate a progress bar with information about the previously accessed media for the viewer to see in a screen of new media content so that the viewer can choose to return to interesting aspects from the previously accessed media. The segments included in the progress bar 430 may have various actions that may be performed by the media guidance application in response to a selection by the user of a segment.

Figure 5:
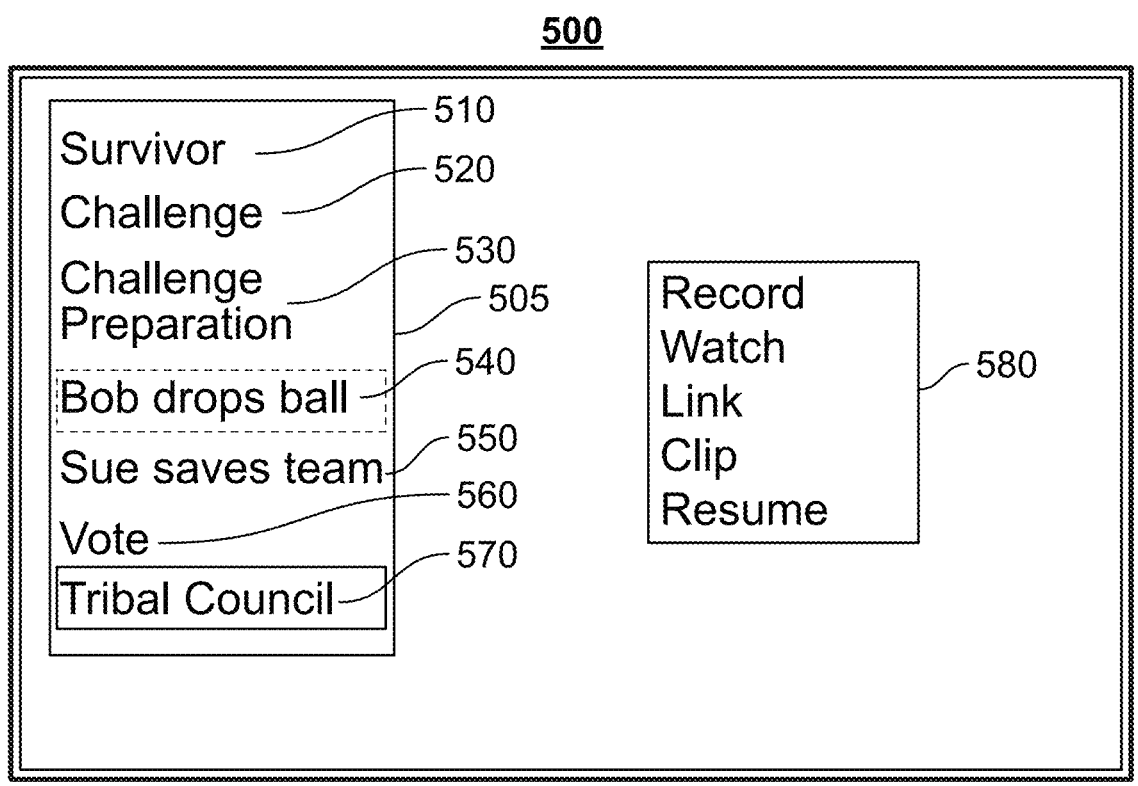
FIG. 5 shows an illustrative example of a progress bar and options menu for media content generated by a media guidance application in accordance with some embodiments of the disclosure.

For example, turning to FIG. 5, a display screen 500 may be generated upon selection of one of the items in a progress bar, such as progress bar 505. The progress bar 505 may include one or more segments about a previously accessed media item. As shown in FIG. 5, the segments may relate to an episode of Survivor that was previously accessed. The segment may include events that have occurred in the episode of Survivor since the viewer stopped accessing the episode. For example, the progress bar 505 may include a title of the previously accessed media content Survivor 510, as well as events that have occurred during the progression of the episode, e.g., a challenge 520, challenge preparation 530, Bob drops ball 540, Sue saves team 550, a vote 560 and a meeting of the tribal council 570. Any of the segments included in the list of items in the progress bar 505 may be selected by the viewer to access actions related to the items. The segments included in the list in the progress bar 505 may be highlighted, e.g. Bob drops ball 540. In addition, another item may be highlighted in a different manner, e.g., the Tribal Council 570 to indicate another event that may be interesting to a viewer for a different reason, or that may lead to a different type of content or content from a different type of source. Other types of highlighting may also be used to distinguish between actions available for the segments.

When a segment is selected from progress bar 505, the media guidance application may receive the selection and generate a media interaction option window 580 for a user to select an action to perform in connection with the selected segment. As shown, some choices for interacting with the selected segment may include to record the segment or previously accessed content, return to watch the previously accessed content at a time associated with the segment, access to a link related to the segment, for example, access to a link that can be shared on social media, watch a video clip associated with the segment, or resume watching the previously accessed content, either at the current time in the progression of the content, or from the time the viewer stopped accessing the content. Other options may also be included in options window 580 for interacting with the previously accessed content. Although not shown in FIG. 5, the media content being displayed prior to selection of an item from the progress bar 505 may continue to be displayed underneath the option window 580.

Figure 6:
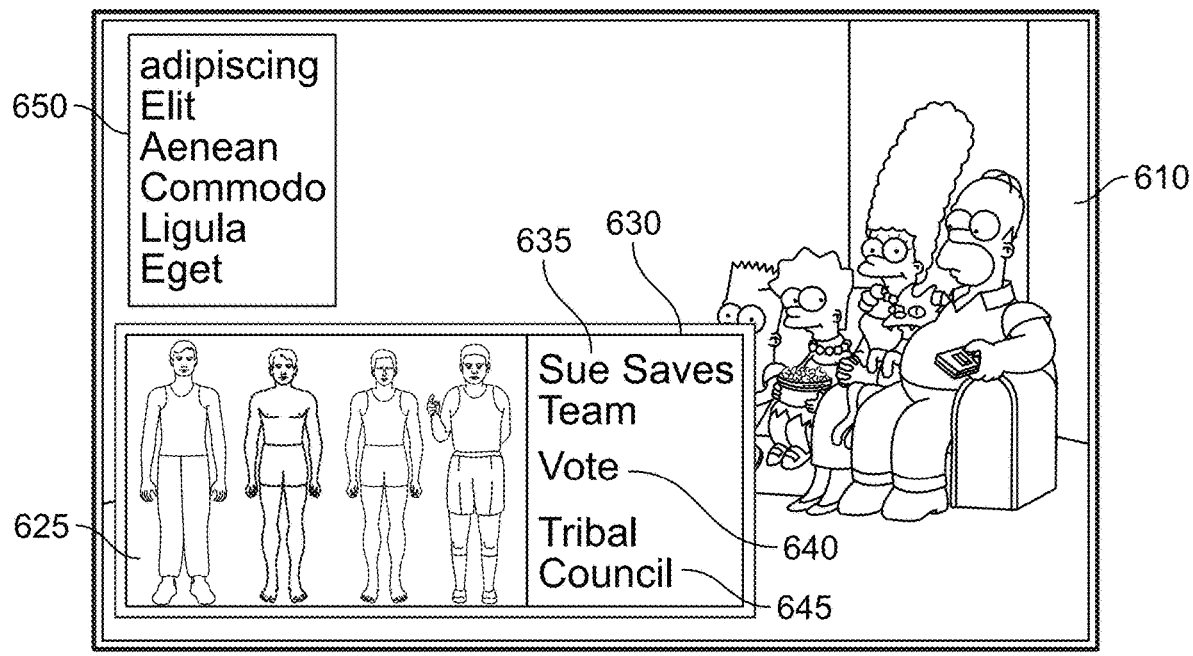
FIG. 6 shows another illustrative example of media content and a progress bar being displayed with a picture-in-picture display and information about other media content in a screen generated by a media guidance application in accordance with some embodiments of the disclosure.

A viewer may select one of the actions for a segment from progress bar 505, for example, to view a segment about Survivor associated with Bob dropping the ball. In response to receiving such selection, the media guidance application may generate a display such as that shown in FIG. 6. Turning to FIG. 6, a screen 600 may include the media content that was being viewed, i.e., the Simpsons 610, along with a picture-in-picture display 630 of the previously accessed content at the time associated with Bob dropping the ball. As the picture-in-picture display 630 may include a video clip 625 or the previously accessed content beginning at a time associated with the segment for Bob dropping the ball 625. The picture-in-picture display 630 may also include a progress bar that includes details about the previously accessed content (the Survivor episode) following a timestamp associated with the selected segment. For example, the progress bar includes segments such as Sue saves team 635, a vote 640 and the Tribal Council 645 segments of show. In some scenarios, it may be suitable to include other segments in the progress bar following the time the viewer previously stopped accessing the Survivor episode.

In some arrangements, the media guidance application may generate for display an additional progress bar 650 for the second or main media content so that if the viewer is distracted by the picture-in-picture display of the previously accessed content, then the viewer can see a list of segments that have occurred in the media content since the time the viewer started seeing the picture-in-picture display. For example, as shown, a progress bar 650 may include information about events occurring in the Simpsons episode 610 being viewed by the viewer behind the picture-in-picture display 630 of the Survivor segment. As with the other progress bars discussed with reference to other figures, progress bar 650 may include details about the media content obtained by the media guidance application by monitoring metadata for the media content as well as third-party sources of information about the media content.

Figure 7:
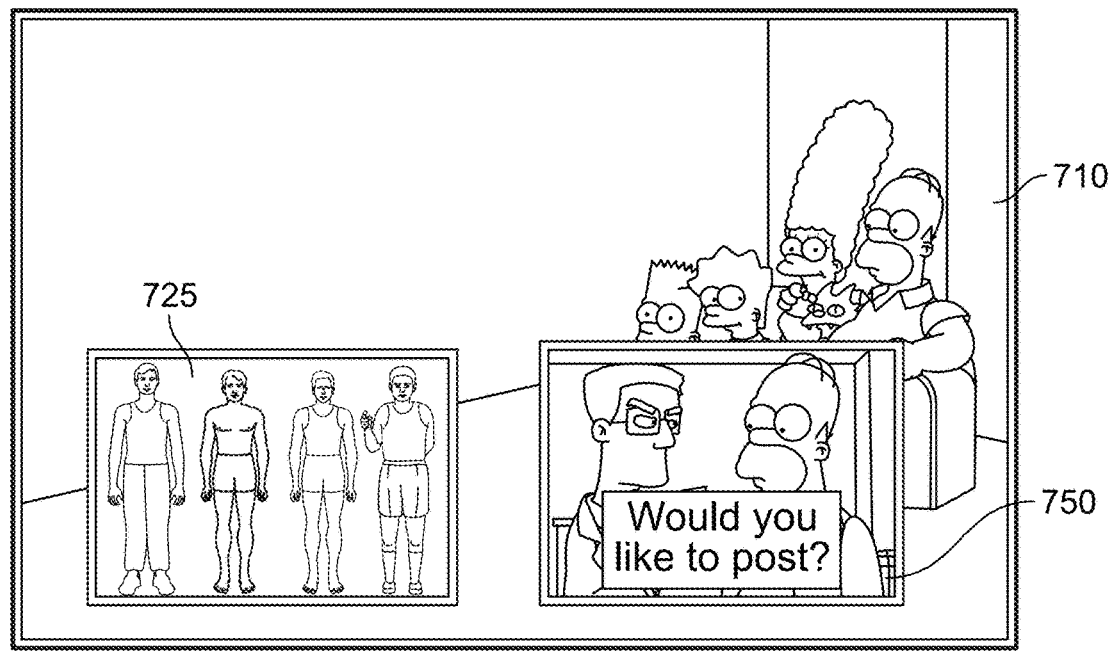
FIG. 7 shows an illustrative example of media content, a picture-in-picture display of other content, and an option for interacting with media content generated by a media guidance application in accordance with some embodiments of the disclosure.

After the viewer has concluded watching media content, such as the Simpsons episode, or the segment of the Survivor episode selected in FIG. 5, the ending of the media content may include some additional interactive actions provided by the media guidance application. For example, as shown in FIG. 7, an illustrative screen 700 is depicted including a background image of media content such as the Simpsons 710. A picture-in-picture display 725 of the previously accessed content may also be displayed in screen 700. When the episode of the Simpsons has concluded, the media guidance application may present an image 750 associated with the Simpson series or the particular episode of the Simpsons that was just watched. The image 750 may be selected by the viewer to post to social media for the viewer. For example, the viewer may select the image 750 and be presented with a screen to post the image 750 to a connected Twitter account for the viewer. In another example, the media guidance application may present text suitable for including with, or without, the image 750 for the viewer to post to social media about the media content. The source of the image 750 and/or any text may be obtained by the media guidance application by searching media databases for a suitable image. In some scenarios, there may be numerous suitable images for the media content. In this case, the media guidance application may select an image based on metadata for the image as well as popularity of the image, based on the user profile, or combination thereof.

Although the examples described with reference to FIGS. 1-7 have involved only sporting events, reality television, and an episode of a television series, any types of media may be treated in the same fashion and presented by the media guidance application with a progress bar for the previously accessed content so that viewer can be informed of events occurring in the previously accessed content.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 8:
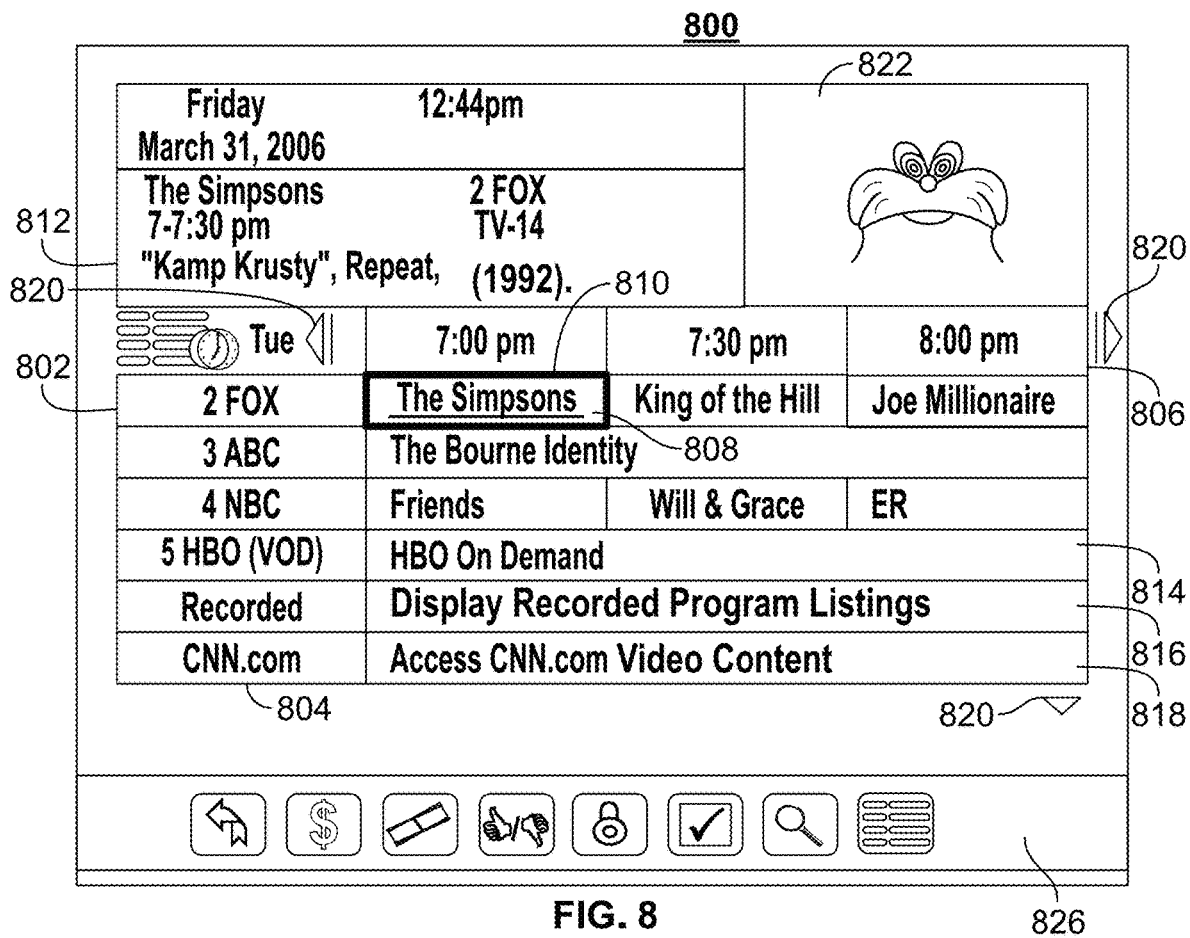
FIGS. 8-9 show other illustrative examples of display screens generated by a media guidance application in accordance with some embodiments of the disclosure.
Figure 9:
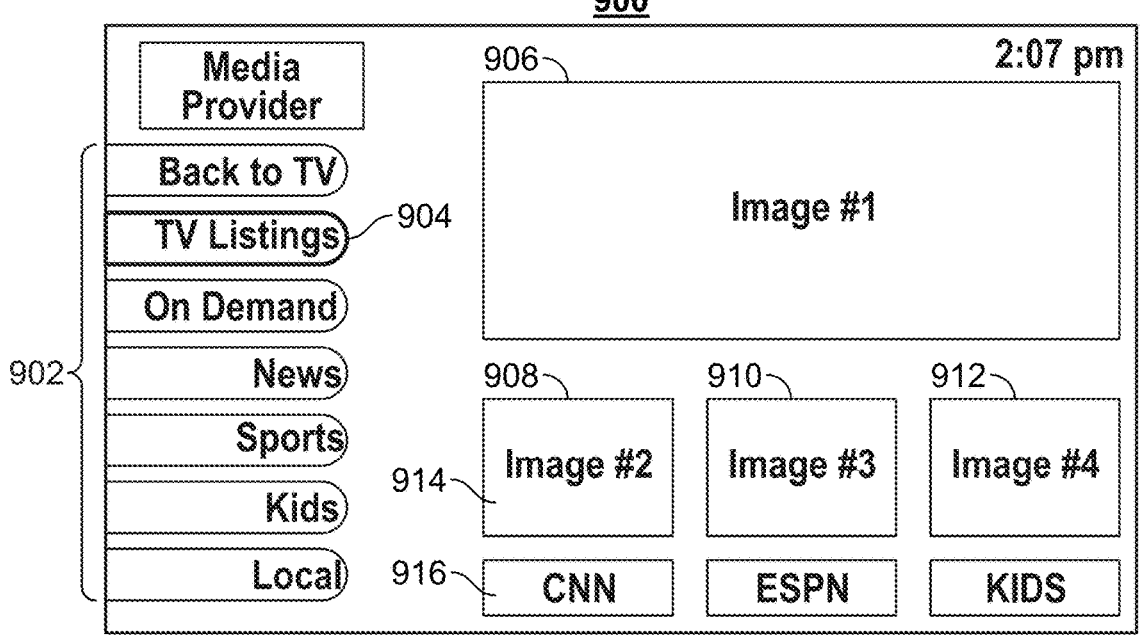

FIGS. 8-9 show illustrative display screens that may be used to provide media guidance data. The display screens shown in FIGS. 8-9 may be implemented on any suitable user equipment device or platform. While the displays of FIGS. 8-9 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 8 shows illustrative grid of a program listings display 800 arranged by time and channel that also enables access to different types of content in a single display. Display 800 may include grid 802 with: (1) a column of channel/content type identifiers 804, where each channel/content type identifier (which is a cell in the column) identifies a different channel or content type available; and (2) a row of time identifiers 806, where each time identifier (which is a cell in the row) identifies a time block of programming. Grid 802 also includes cells of program listings, such as program listing 808, where each listing provides the title of the program provided on the listing's associated channel and time. With a user input device, a user can select program listings by moving highlight region 810. Information relating to the program listing selected by highlight region 810 may be provided in program information region 812. Region 812 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 802 may provide media guidance data for non-linear programming including on-demand listing 814, recorded content listing 816, and Internet content listing 818. A display combining media guidance data for content from different types of content sources is sometimes referred to as a "mixed-media" display. Various permutations of the types of media guidance data that may be displayed that are different than display 800 may be based on user selection or guidance application definition (e.g., a display of only recorded and broadcast listings, only on-demand and broadcast listings, etc.). As illustrated, listings 814, 816, and 818 are shown as spanning the entire time block displayed in grid 802 to indicate that selection of these listings may provide access to a display dedicated to on-demand listings, recorded listings, or Internet listings, respectively. In some embodiments, listings for these content types may be included directly in grid 802. Additional media guidance data may be displayed in response to the user selecting one of the navigational icons 820. (Pressing an arrow key on a user input device may affect the display in a similar manner as selecting navigational icons 820.)

Display 800 may also include video region 822, and options region 826. Video region 822 may allow the user to view and/or preview programs that are currently available, will be available, or were available to the user. The content of video region 822 may correspond to, or be independent from, one of the listings displayed in grid 802. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 826 may allow the user to access different types of content, media guidance application displays, and/or media guidance application features. Options region 826 may be part of display 800 (and other display screens described herein), or may be invoked by a user by selecting an on-screen option or pressing a dedicated or assignable button on a user input device. The selectable options within options region 826 may concern features related to program listings in grid 802 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 11. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 9. Video mosaic display 900 includes selectable options 902 for content information organized based on content type, genre, and/or other organization criteria. In display 900, television listings option 904 is selected, thus providing listings 906, 908, 910, and 912 as broadcast program listings. In display 900 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 908 may include more than one portion, including media portion 914 and text portion 916. Media portion 914 and/or text portion 916 may be selectable to view content in full-screen or to view information related to the content displayed in media portion 914 (e.g., to view listings for the channel that the video is displayed on).

The listings in display 900 are of different sizes (i.e., listing 906 is larger than listings 908, 910, and 912), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 10:
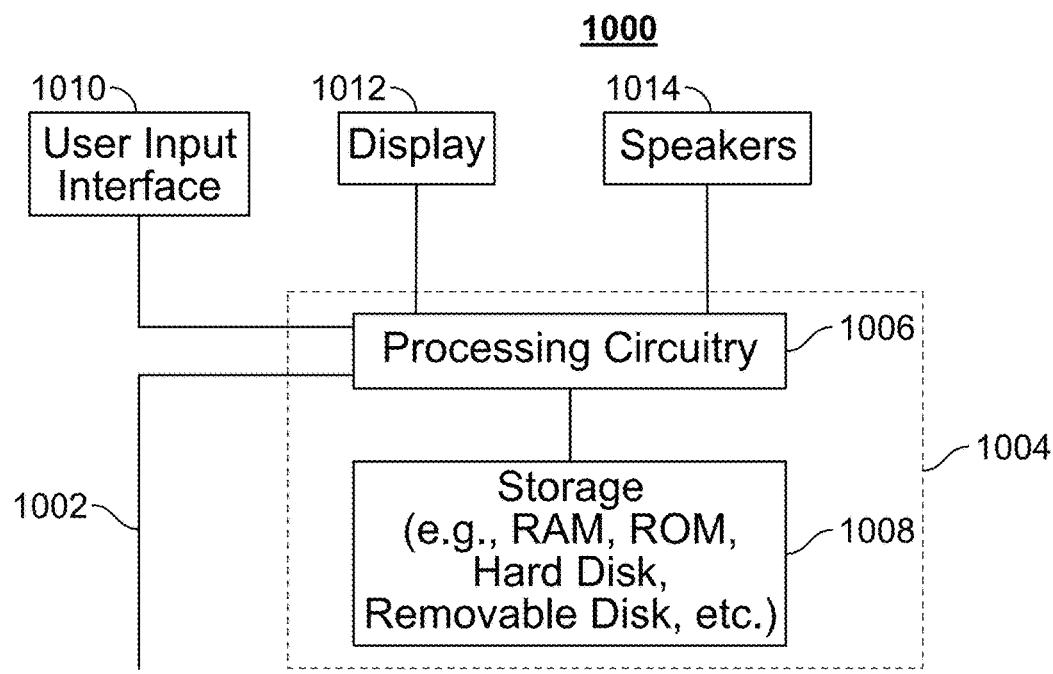
FIG. 10 is a block diagram of an illustrative user equipment device in accordance with some embodiments of the disclosure.

Users may access content and the media guidance application (and its display screens described above and below) from one or more of their user equipment devices. FIG. 10 shows a generalized embodiment of illustrative user equipment device 1000. More specific implementations of user equipment devices are discussed below in connection with FIG. 11. User equipment device 1000 may receive content and data via input/output (hereinafter "I/O") path 1002. I/O path 1002 may provide content (e.g., broadcast programming, on-demand programming, Internet content, content available over a local area network (LAN) or wide area network (WAN), and/or other content) and data to control circuitry 1004, which includes processing circuitry 1006 and storage 1008. Control circuitry 1004 may be used to send and receive commands, requests, and other suitable data using I/O path 1002. I/O path 1002 may connect control circuitry 1004 (and specifically processing circuitry 1006) to one or more communications paths (described below). I/O functions may be provided by one or more of these communications paths, but are shown as a single path in FIG. 10 to avoid overcomplicating the drawing.

Control circuitry 1004 may be based on any suitable processing circuitry such as processing circuitry 1006. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1004 executes instructions for a media guidance application stored in memory (i.e., storage 1008). Specifically, control circuitry 1004 may be instructed by the media guidance application to perform the functions discussed above and below. For example, the media guidance application may provide instructions to control circuitry 1004 to generate the media guidance displays. In some implementations, any action performed by control circuitry 1004 may be based on instructions received from the media guidance application.

In client-server based embodiments, control circuitry 1004 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 11). In addition, communications circuitry may include circuitry that enables peer-to-peer communication of user equipment devices, or communication of user equipment devices in locations remote from each other (described in more detail below).

Memory may be an electronic storage device provided as storage 1008 that is part of control circuitry 1004. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 1008 may be used to store various types of content described herein as well as media guidance data described above. Nonvolatile memory may also be used (e.g., to launch a boot-up routine and other instructions). Cloud-based storage, described in relation to FIG. 11, may be used to supplement storage 1008 or instead of storage 1008.

Control circuitry 1004 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 1004 may also include scaler circuitry for upconverting and downconverting content into the preferred output format of the user equipment 1000. Circuitry 1004 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 1008 is provided as a separate device from user equipment 1000, the tuning and encoding circuitry (including multiple tuners) may be associated with storage 1008.

A user may send instructions to control circuitry 1004 using user input interface 1010. User input interface 1010 may be any suitable user interface, such as a remote control, mouse, trackball, keypad, keyboard, touch screen, touchpad, stylus input, joystick, voice recognition interface, or other user input interfaces. Display 1012 may be provided as a stand-alone device or integrated with other elements of user equipment device 1000. For example, display 1012 may be a touchscreen or touch-sensitive display. In such circumstances, user input interface 1010 may be integrated with or combined with display 1012. Display 1012 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 1012 may be HDTV-capable. In some embodiments, display 1012 may be a 3D display, and the interactive media guidance application and any suitable content may be displayed in 3D. A video card or graphics card may generate the output to the display 1012. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 1004. The video card may be integrated with the control circuitry 1004. Speakers 1014 may be provided as integrated with other elements of user equipment device 1000 or may be stand-alone units. The audio component of videos and other content displayed on display 1012 may be played through speakers 1014. In some embodiments, the audio may be distributed to a receiver (not shown), which processes and outputs the audio via speakers 1014.

The guidance application may be implemented using any suitable architecture. For example, it may be a stand-alone application wholly-implemented on user equipment device 1000. In such an approach, instructions of the application are stored locally (e.g., in storage 1008), and data for use by the application is downloaded on a periodic basis (e.g., from an out-of-band feed, from an Internet resource, or using another suitable approach). Control circuitry 1004 may retrieve instructions of the application from storage 1008 and process the instructions to generate any of the displays discussed herein. Based on the processed instructions, control circuitry 1004 may determine what action to perform when input is received from input interface 1010. For example, movement of a cursor on a display up/down may be indicated by the processed instructions when input interface 1010 indicates that an up/down button was selected.

In some embodiments, the media guidance application is a client-server based application. Data for use by a thick or thin client implemented on user equipment device 1000 is retrieved on-demand by issuing requests to a server remote to the user equipment device 1000. In one example of a client-server based guidance application, control circuitry 1004 runs a web browser that interprets web pages provided by a remote server. For example, the remote server may store the instructions for the application in a storage device. The remote server may process the stored instructions using circuitry (e.g., control circuitry 1004) and generate the displays discussed above and below. The client device may receive the displays generated by the remote server and may display the content of the displays locally on equipment device 1000. This way, the processing of the instructions is performed remotely by the server while the resulting displays are provided locally on equipment device 1000. Equipment device 1000 may receive inputs from the user via input interface 1010 and transmit those inputs to the remote server for processing and generating the corresponding displays. For example, equipment device 1000 may transmit a communication to the remote server indicating that an up/down button was selected via input interface 1010. The remote server may process instructions in accordance with that input and generate a display of the application corresponding to the input (e.g., a display that moves a cursor up/down). The generated display is then transmitted to equipment device 1000 for presentation to the user.

In some embodiments, the media guidance application is downloaded and interpreted or otherwise run by an interpreter or virtual machine (run by control circuitry 1004). In some embodiments, the guidance application may be encoded in the ETV Binary Interchange Format (EBIF), received by control circuitry 1004 as part of a suitable feed, and interpreted by a user agent running on control circuitry 1004. For example, the guidance application may be an EBIF application. In some embodiments, the guidance application may be defined by a series of JAVA-based files that are received and run by a local virtual machine or other suitable middleware executed by control circuitry 1004. In some of such embodiments (e.g., those employing MPEG-2 or other digital media encoding schemes), the guidance application may be, for example, encoded and transmitted in an MPEG-2 object carousel with the MPEG audio and video packets of a program.

Figure 11:
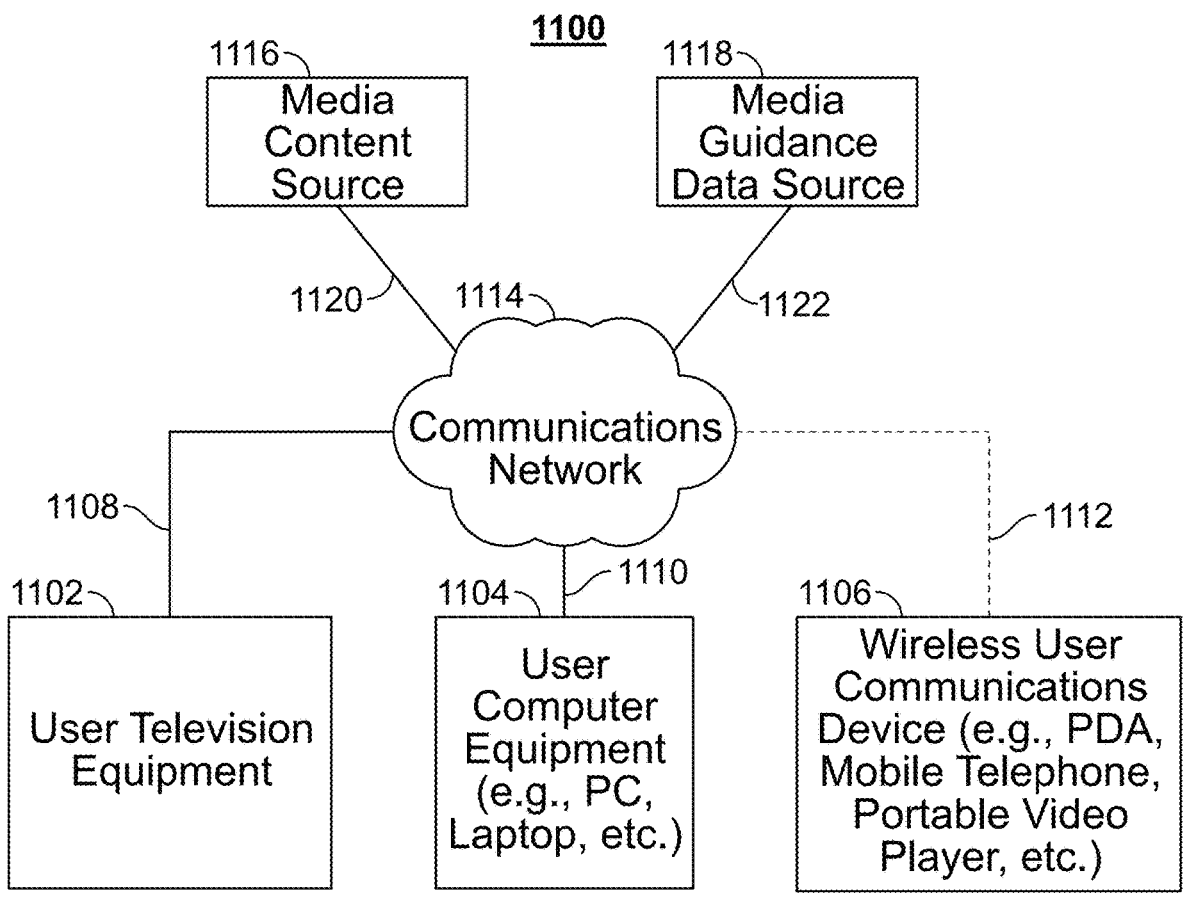
FIG. 11 is a block diagram of an illustrative media system in accordance with some embodiments of the disclosure.

User equipment device 1000 of FIG. 10 can be implemented in system 1100 of FIG. 11 as user television equipment 1102, user computer equipment 1104, wireless user communications device 1106, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 10 may not be classified solely as user television equipment 1102, user computer equipment 1104, or a wireless user communications device 1106. For example, user television equipment 1102 may, like some user computer equipment 1104, be Internet-enabled allowing for access to Internet content, while user computer equipment 1104 may, like some television equipment 1102, include a tuner allowing for access to television programming. The media guidance application may have the same layout on various different types of user equipment or may be tailored to the display capabilities of the user equipment. For example, on user computer equipment 1104, the guidance application may be provided as a web site accessed by a web browser. In another example, the guidance application may be scaled down for wireless user communications devices 1106.

In system 1100, there is typically more than one of each type of user equipment device but only one of each is shown in FIG. 11 to avoid overcomplicating the drawing. In addition, each user may utilize more than one type of user equipment device and also more than one of each type of user equipment device.

In some embodiments, a user equipment device (e.g., user television equipment 1102, user computer equipment 1104, wireless user communications device 1106) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 1114. Namely, user television equipment 1102, user computer equipment 1104, and wireless user communications device 1106 are coupled to communications network 1114 via communications paths 1108, 1110, and 1112, respectively. Communications network 1114 may be one or more networks including the Internet, a mobile phone network, mobile voice or data network (e.g., a 4G or LTE network), cable network, public switched telephone network, or other types of communications network or combinations of communications networks. Paths 1108, 1110, and 1112 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 1112 is drawn with dotted lines to indicate that in the exemplary embodiment shown in FIG. 11 it is a wireless path and paths 1108 and 1110 are drawn as solid lines to indicate they are wired paths (although these paths may be wireless paths, if desired). Communications with the user equipment devices may be provided by one or more of these communications paths, but are shown as a single path in FIG. 11 to avoid overcomplicating the drawing.

Although communications paths are not drawn between user equipment devices, these devices may communicate directly with each other via communication paths, such as those described above in connection with paths 1108, 1110, and 1112, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 1114.

System 1100 includes content source 1116 and media guidance data source 1118 coupled to communications network 1114 via communication paths 1120 and 1122, respectively. Paths 1120 and 1122 may include any of the communication paths described above in connection with paths 1108, 1110, and 1112. Communications with the content source 1116 and media guidance data source 1118 may be exchanged over one or more communications paths, but are shown as a single path in FIG. 11 to avoid overcomplicating the drawing. In addition, there may be more than one of each of content source 1116 and media guidance data source 1118, but only one of each is shown in FIG. 11 to avoid overcomplicating the drawing. (The different types of each of these sources are discussed below.) If desired, content source 1116 and media guidance data source 1118 may be integrated as one source device. Although communications between sources 1116 and 1118 with user equipment devices 1102, 1104, and 1106 are shown as through communications network 1114, in some embodiments, sources 1116 and 1118 may communicate directly with user equipment devices 1102, 1104, and 1106 via communication paths (not shown) such as those described above in connection with paths 1108, 1110, and 1112.

Content source 1116 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 1116 may be the originator of content (e.g., a television broadcaster, a Webcast provider, etc.) or may not be the originator of content (e.g., an on-demand content provider, an Internet provider of content of broadcast programs for downloading, etc.). Content source 1116 may include cable sources, satellite providers, on-demand providers, Internet providers, over-the-top content providers, or other providers of content. Content source 1116 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 1118 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 1118 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 1118 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 1118 may provide user equipment devices 1102, 1104, and 1106 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 1008, and executed by control circuitry 1004 of a user equipment device 1000. In some embodiments, media guidance applications may be client-server applications where only a client application resides on the user equipment device, and server application resides on a remote server. For example, media guidance applications may be implemented partially as a client application on control circuitry 1004 of user equipment device 1000 and partially on a remote server as a server application (e.g., media guidance data source 1118) running on control circuitry of the remote server. When executed by control circuitry of the remote server (such as media guidance data source 1118), the media guidance application may instruct the control circuitry to generate the guidance application displays and transmit the generated displays to the user equipment devices. The server application may instruct the control circuitry of the media guidance data source 1118 to transmit data for storage on the user equipment. The client application may instruct control circuitry of the receiving user equipment to generate the guidance application displays.

Content and/or media guidance data delivered to user equipment devices 1102, 1104, and 1106 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 1100 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 11.

In one approach, user equipment devices may communicate with each other within a home network. User equipment devices can communicate with each other directly via short-range point-to-point communication schemes described above, via indirect paths through a hub or other similar device provided on a home network, or via communications network 1114. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 1116 to access content. Specifically, within a home, users of user television equipment 1102 and user computer equipment 1104 may access the media guidance application to navigate among and locate desirable content. Users may also access the media guidance application outside of the home using wireless user communications devices 1106 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 1114. These cloud resources may include one or more content sources 1116 and one or more media guidance data sources 1118. In addition or in the alternative, the remote computing sites may include other user equipment devices, such as user television equipment 1102, user computer equipment 1104, and wireless user communications device 1106. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 1104 or wireless user communications device 1106 having content capture feature. Alternatively, the user can first transfer the content to a user equipment device, such as user computer equipment 1104. The user equipment device storing the content uploads the content to the cloud using a data transmission service on communications network 1114. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 10.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 12:
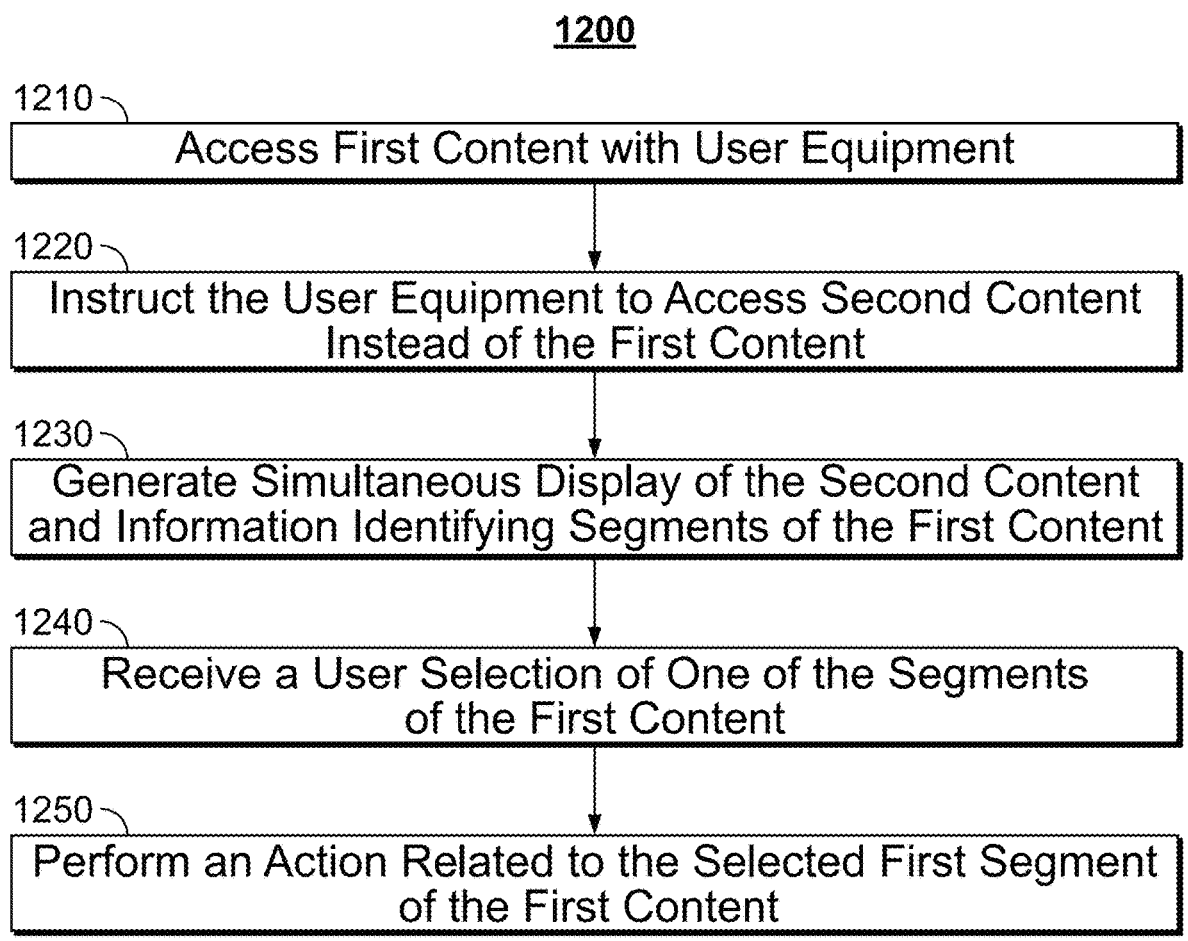

FIG. 12 is a flowchart of illustrative steps of a process 1200 for providing information to a viewer about previously accessed content in accordance with some embodiments of the disclosure. It should be noted that process 1200 or any step thereof could be performed on, or provided by, any of the devices shown in FIGS. 10-11. For example, process 1200 may be executed by control circuitry 1004 (FIG. 10) as instructed by a media guidance application implemented on a user device (e.g., user equipment devices 1102, 1104, and/or 1106 (FIG. 11)) to present a progress bar of information related to previously accessed content. In addition, one or more steps of process 1200 may be incorporated into or combined with one or more steps of any other process or embodiment described herein.

FIG. 12 depicts an illustrative process 1200 for providing information about a previously accessed media content item. At step 1210, control circuitry 1004 for a media guidance application may access a first media content item using user equipment (e.g., user equipment devices 1102, 1104, and/or 1106 (FIG. 11)). The media guidance application control circuitry 1004 may access the first media content from any media source and generate a display of the first media content in a screen for the user equipment. Using an example from above, the viewer may wish to view a basketball game and will make media guidance application selections to cause the basketball game to be displayed. The viewer may then wish to access another item of media.

At step 1220, the media guidance application may instruct the user equipment to access second content instead of the first content. In this step, the viewer may wish to change from watching the basketball game, for example, to accessing a television program—the Simpsons—and the viewer may have made a selection in the media guidance application to request the change in media access.

The control circuitry 1004 for a media guidance application may generate a simultaneous display of the second content and information identifying segments of the first content at step 1230. For example, in response to receiving a user request to access second content, the media guidance application will generate a display of the second content along with information about the previously accessed first content. Following the basketball game example, the media guidance application may generate a display of a content for the second media item, such as the Simpsons, with a simultaneous display of information about the basketball game that the viewer has stopped accessing. The information identifying segments for the first content displayed at step 1230 may be events occurring in the first content, i.e., events occurring in the basketball game, since the viewer stopped accessing the basketball game. Selected information identifying segments may be displayed in a progress bar.

The information identifying segments for the first content may be related to segments of the first content that may be interesting to the viewer. The segments displayed for the viewer may also be selectable to obtain actions associated with the segments. At step 1240, the media guidance application may receive a user selection of one of the segments of the first content. For example, the viewer may select, using a user input device, such as a touchscreen for the display, a remote control, a keyboard or other input device, one of the segments about the first content.

Upon receipt of the user selection of one of the segments of the first content, the media guidance application will perform an action related to the selected first segment of the first content, at step 1250. For example, a user may select a segment from a progress bar for the basketball game that relates to a free throw. In response to this selection, the media guidance application will perform an action associated with the selected segment such as record the free throw, add it to a user's watch list, link to the free throw, return to the basketball game at the time of the free throw, or other suitable action.

It is contemplated that the steps or descriptions of FIG. 12 may be used with any other embodiment of this disclosure. In addition, the steps and descriptions described in relation to FIG. 12 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 10-11 could be used to perform one or more of the steps in FIG. 12.

FIG. 13 is a flowchart of illustrative steps of a process 1300 for providing information to a viewer about previously accessed media content in accordance with some embodiments of the disclosure. It should be noted that process 1300 or any step thereof could be performed on, or provided by, any of the devices shown in FIGS. 10-11. For example, process 1300 may be executed by control circuitry 1004 (FIG. 10) as instructed by a media guidance application implemented on a user device (e.g., user equipment devices 1102, 1104, and/or 1106 (FIG. 11)) to present a progress bar of information related to previously accessed content. In addition, one or more steps of process 1300 may be incorporated into or combined with one or more steps of any other process or embodiment described herein.

FIG. 13 depicts steps in an illustrative process 1300 for presenting segments of information about a previously accessed media item. Process 1300 may begin with a viewer who wishes to watch a media content. At step 1305, control circuitry 1004 for a media guidance application may access first content with user equipment. The media guidance application may access some item of media content and cause it to be displayed on a screen of a user device, such as a television or other tablet. The media content may be any type of media supplied by a media source.

The user may then wish to view another media item. The viewer may use the media guidance application to access another media item. At step 1310 the control circuitry 1004 for the media guidance application will instruct the user equipment to access second content instead of the first content. The second content is accessed at a first progression point in the first content. Information about the first progression point, such as a time associated with the first progression point may be stored by the control circuitry 1004 for the media guidance application in a memory or cache. In an example, the user may have started initially watching a basketball game, but then changes to accessing another media item such as an episode of the series the Simpsons. In this example, the control circuitry 1004 for the media guidance application will store a timestamp for a time associated with the progression of the basketball game when the viewer stopped accessing the basketball game.

At step 1315, while the second content is being accessed, the control circuitry 1004 for the media guidance application will monitor metadata associated with the first content for a plurality of events that are associated with respective timestamps that follow the first progression point. Using the above example, while the episode of the Simpsons is being accessed by the viewer, the media guidance application may monitor metadata about the basketball game for events occurring in the game that have a timestamp that follows the first progression point, i.e., when the viewer stopped watching the basketball game. The metadata may be monitored by the control circuitry 1004 for the media guidance application from one or more media sources, or from a third-party media source or user generated commentary about the media. Generally speaking, the media guidance application will focus on events having metadata that indicates a timestamp for the event that occurs following the first progression point because events that occurred while the user was accessing the media content, before the user stopped watching the media content, would likely have been seen and would be less interesting to the viewer.

At step 1320, in response to detecting an event of the plurality of events in the first content, the control circuitry 1004 for the media guidance application may store information identifying the event in a list of segments of the first content that follow the first progression point. For example, the control circuitry 1004 for the media guidance application may store timestamp information for an event in the first content. In addition, the control circuitry 1004 for the media guidance application may determine links or availability of content associated with the event and store such information in a cache. In the basketball example, the control circuitry 1004 for the media guidance application may detect a plurality of events, such as scoring events from a sports feed for the basketball game. Such events may be captured along with timestamp information for the events and stored by the control circuitry 1004 for the media guidance application.

At step 1325 the control circuitry 1004 for the media guidance application may generate for display on the user equipment, a simultaneous display of the second content and the list of segments of the first content that follow the first progression point. For example, the control circuitry 1004 for the media guidance application may review the stored events and select one or more the stored events for the previously accessed media and generate a progress bar of certain events to display in the user equipment screen. In general, the display of the progress bar may be relatively limited in the screen space so that it is not overly distracting to the viewer. The event segments selected to be included in the progress bar may be changed over time as the content progresses and more and more events occur in the content, and in addition, more metadata and user generated commentary about the events becomes available. In some arrangements, some of the events may be presented in a manner that highlights certain events as being more relevant to interesting to the user. Such events may be identified by the control circuitry 1004 for the media guidance application using metadata for the event, user preference information, popularity of the event, etc. The segments in the list may be selected by the viewer.

At step 1330, the control circuitry 1004 for the media guidance application may receive a user selection of a first of the segments in the list of the first content. The user selection may be made by the user using a user input technique such as an input in a remote control or using a touchscreen device or keyboard, etc., to enter a selection of a segment via the media guidance application. The segment selection may be one of the list of segments in the progress bar in the display in the user equipment screen. For example, a progress bar may include various scoring events in the basketball game and may include a segment about a free throw by one of the players. The viewer may wish to view the free throw, and so the viewer may select the respective segment for the free throw.

In response to the user selection, the control circuitry 1004 for the media guidance application may retrieve timestamps of the first segment that represent a start time and an end time of the first event in the first content at step 1335. In this step, the control circuitry 1004 for the media guidance application will consult its cache of information about the events to check for timestamps associated with the events to identify a start and end time for the segment. The timestamps can be used to present the relevant part of the content to the viewer.

At step 1340, the control circuitry 1004 for the media guidance application will perform an action related to the selected first segment of the first content based on the retrieved timestamps. For example, the control circuitry 1004 for the media guidance application can cause the content associated with the selected segment to be recorded, added to a viewer's watch list, resume watching, share a link to the content, or other action. The control circuitry 1004 for the media guidance application may access the relevant content from a media source using the timestamps for the segment to locate the exact portion of the media that the viewer wishes to access.

It is contemplated that the steps or descriptions of FIG. 13 may be used with any other embodiment of this disclosure. In addition, the steps and descriptions described in relation to FIG. 13 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 10-11 could be used to perform one or more of the steps in FIG. 13.

Figure 14:
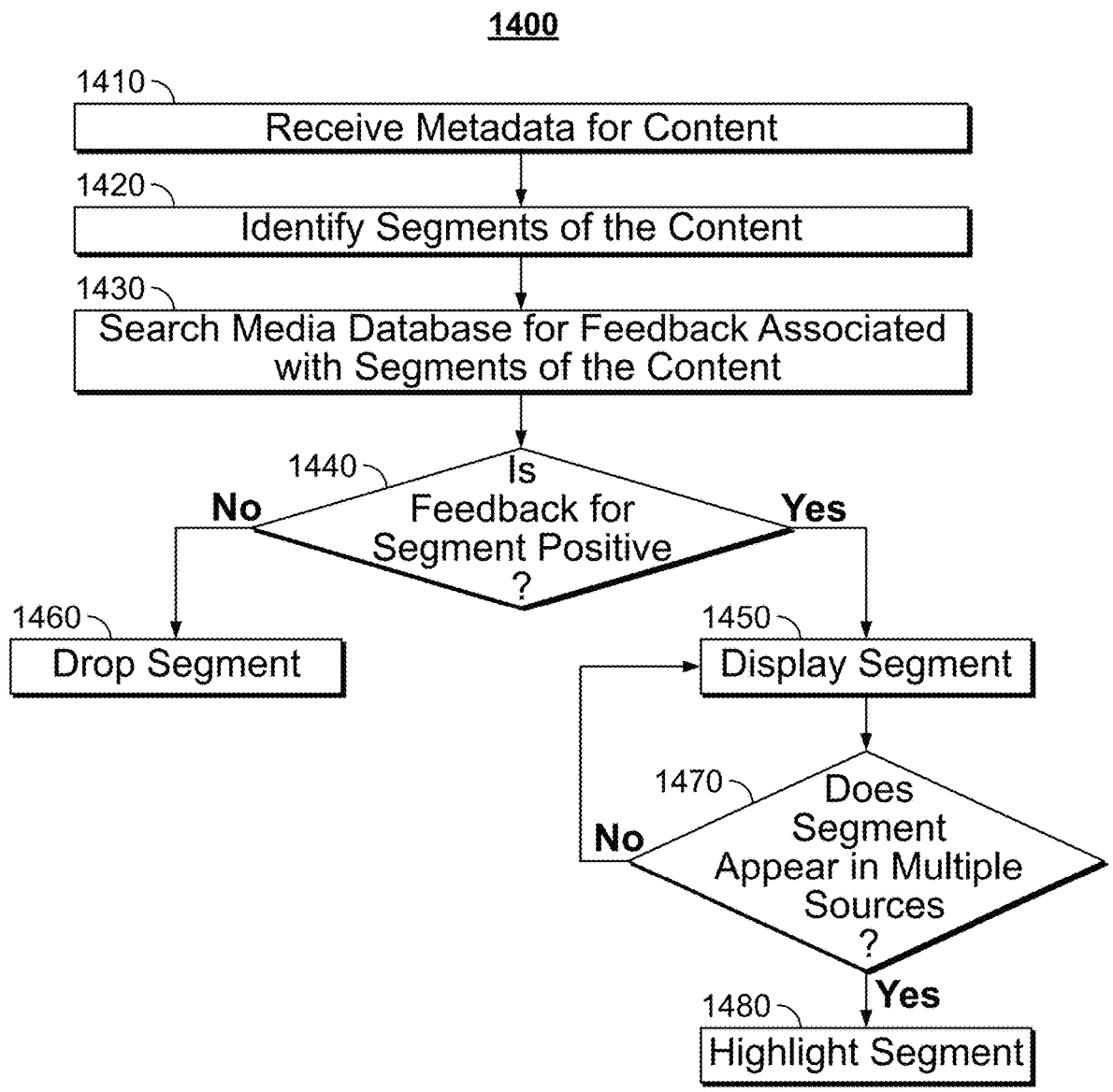
FIGS. 14-16 are flowcharts of illustrative processes for selecting segments to include in a progress bar for recently viewed media content, in accordance with some embodiments of the disclosure.

FIG. 14 is a flowchart of illustrative steps of a process 1400 for selecting a segment of previously accessed content to include in a progress bar display in accordance with some embodiments of the disclosure. It should be noted that process 1400 or any step thereof could be performed on, or provided by, any of the devices shown in FIGS. 10-11. For example, process 1400 may be executed by control circuitry 1004 (FIG. 10) as instructed by a media guidance application implemented on a user device (e.g., user equipment devices 1102, 1104, and/or 1106 (FIG. 11)) to present a progress bar of information related to previously accessed content. In addition, one or more steps of process 1300 may be incorporated into or combined with one or more steps of any other process or embodiment described herein.

FIG. 14 is a flowchart of an illustrative process for selecting segment of previously accessed content to include in a progress bar display. In an example, a viewer may access a basketball game and then access a television program. In the television program display screen, a media guidance application may generate a simultaneous display of a progress bar for the basketball game so that the viewer can watch the television program while also seeing certain highlights or events of the game that they have stopped watching. In order to select the segments or events to include in the progress bar, the media guidance application may monitor metadata for the previously accessed content item, i.e., the basketball game.

The control circuitry 1004 for the media guidance application may monitor one or more media sources for metadata for the previously accessed content. In the example of the basketball game, the media guidance application may monitor a sports feed for the team, organization or channel associated with the basketball game. At step 1410, the control circuitry 1004 for the media guidance application may receive metadata for the previously accessed content, such as the basketball game. The metadata may be any type of data about the previously accessed content. In the basketball game example, scoring, plays and point information may be considered various events. Other events also occur in the basketball game, such as a halftime show, crowd displays, or other events could also have associated metadata. The event metadata may be obtained from a data feed or from third party media sources or social networks. For example, the media guidance application could monitor postings for a hashtag for one or both of the teams playing in the basketball game, or other monitoring technique.

At step 1420, the control circuitry 1004 for the media guidance application may identify segments of the content. The segments may be identified by analyzing the metadata for information indicating events have occurred in the content, such as a play or point scoring event, or player related event or halftime show or other occurrence.

At step 1430, the media guidance application may then search one or more media databases for feedback associated with the identified segments of the content. For example, the media guidance application may search game commentary for instances using the identified segments.

At step 1440, the control circuitry 1004 for the media guidance application may analyze the feedback to determine if it is positive of indicating that it is useful or popular. Such analysis may be based, for example, on whether the segment has been used in any instance in any commentary or social media. The segment may also be analyzed for its respective type and the type may be used to determine whether it is generally useful.

If the control circuitry 1004 for the media guidance application determines that the feedback is positive, then at step 1450, the control circuitry 1004 for the media guidance application may determine to display the segment. If the control circuitry 1004 for the media guidance application determines that the feedback is not positive, then the media guidance application may drop the segment at step 1460 and not use the segment in a list of segments to include in the progress bar for the viewer.

In addition to being included in the list of the progress bar, the control circuitry 1004 for the media guidance application may determine whether to highlight the segment at step 1470 by determining whether the segment is available in multiple sources. At step 1470, the media guidance application may check if the segment has been used or made available in more than one media source. In general, the more instances that the segment is available or appearing in various media sources, may be an indicator that it is popular or interesting to viewers. Thus, if the segment appears in multiple sources, then it may be displayed in the progress in a highlighted or distinctive manner at step 1480 by the control circuitry 1004 for the media guidance application. If the segment does not appear in multiple sources, it may be included or displayed normally in the progress bar. Process 1400 may be repeated as time progresses and more metadata becomes available for the segments.

It is contemplated that the steps or descriptions of FIG. 14 may be used with any other embodiment of this disclosure. In addition, the steps and descriptions described in relation to FIG. 14 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 10-11 could be used to perform one or more of the steps in FIG. 14.

Figure 15:
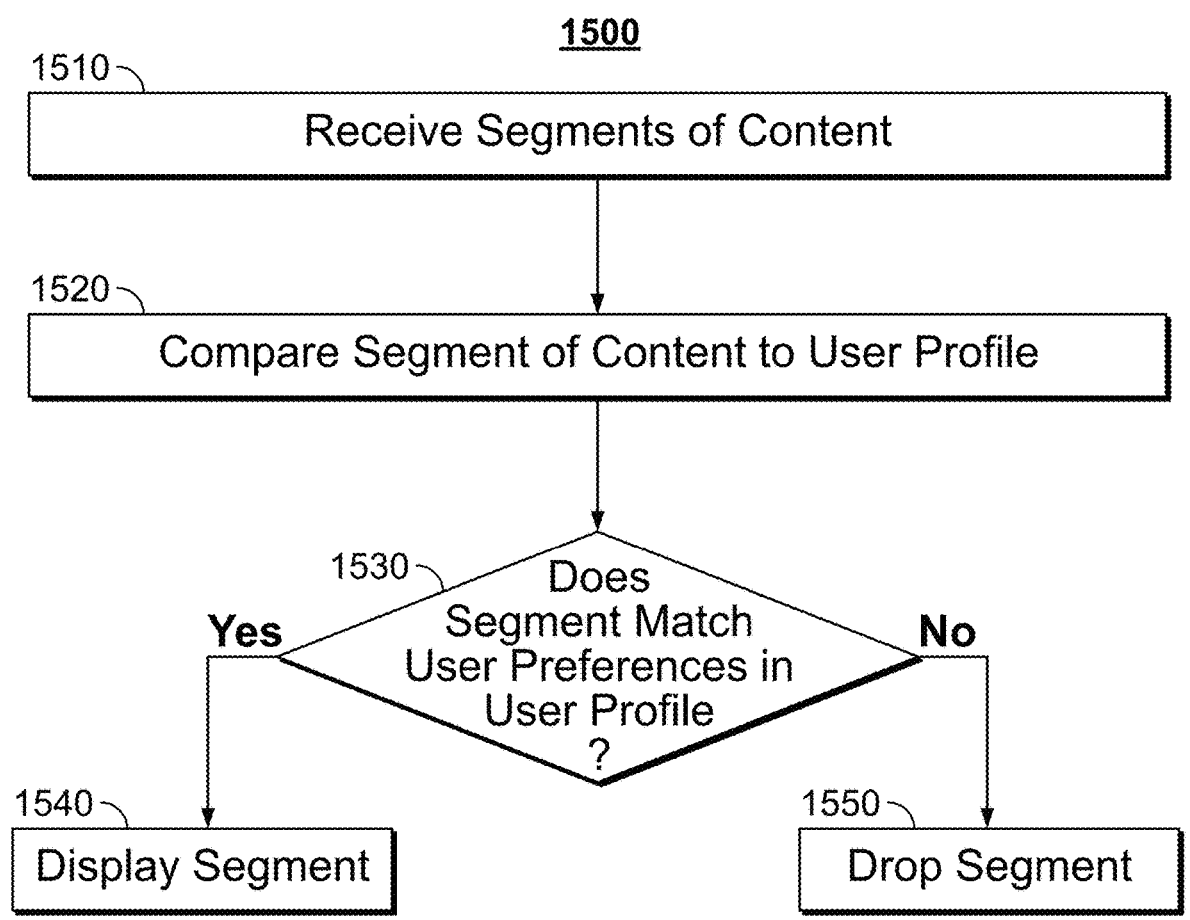

FIG. 15 is a flowchart of illustrative steps of a process 1500 for selecting segments to include in a progress bar for previously accessed media in accordance with some embodiments of the disclosure. It should be noted that process 1500 or any step thereof could be performed on, or provided by, any of the devices shown in FIGS. 10-11. For example, process 1500 may be executed by control circuitry 1004 (FIG. 10) as instructed by a media guidance application implemented on a user device (e.g., user equipment devices 1102, 1104, and/or 1106 (FIG. 11)) to present a progress bar of information related to previously accessed content. In addition, one or more steps of process 1500 may be incorporated into or combined with one or more steps of any other process or embodiment described herein.

FIG. 15 depicts a process 1500 that may be used to select segments to include in a progress bar about previously accessed media. For example, viewer may watch a basketball game and then access a television program. When the television program is displayed, a media guidance application may monitor metadata about the basketball game to obtain events that may be of interest to the user. Information about such events may be included in a progress bar that is displayed in the screen showing the television program. Selection of the segments to include in the progress bar may be performed by the control circuitry 1004 for the media guidance application.

At step 1510, the control circuitry 1004 for the media guidance application may receive metadata indicating segments of the previously accessed content. For example, the media guidance application may receive metadata about plays occurring in the basketball game from a sports feed. The metadata about the plays can include, for example, time information for the play, the type of play, the player involved in the play, or other information.

At step 1520, the control circuitry 1004 for the media guidance application may compare the segment of content to user profile. In this step, the control circuitry 1004 for the media guidance application may compare information about the segment, such as players making plays, type of plays, against the user profile. In an example, a user may have a favorite team or a fantasy basketball team and such information may be included in the user profile. The user profile information may be explicitly added by the user or learned by the media guidance application, for example, by monitoring the user's viewing habits and use of fantasy sports applications.

At step 1530, the control circuitry 1004 for the media guidance application may determine whether the segment matches a user preference in the user profile. For example, the media guidance application may determine which, if any, segments are related to a favorite player, fantasy team player, etc. In another example, the media guidance application may determine if any segments relate to special types of plays. In another example, the media guidance application may determine if any segments are for a halftime show that includes a popular or favorite performer.

Based on the determination at step 1530, the control circuitry 1004 for the media guidance may select matching segments at step 1540 to include in the progress bar for the previously accessed content. For segments that do not match the user profile, the control circuitry 1004 for the media guidance application may drop the segment at 1550 from the list. Process 1500 may be repeated as time progresses and more metadata becomes available for the segments. Process 1400 and 1500 may be used together or separately to improve the relevance of the segments included in the progress bar.

It is contemplated that the steps or descriptions of FIG. 15 may be used with any other embodiment of this disclosure. In addition, the steps and descriptions described in relation to FIG. 15 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 10-11 could be used to perform one or more of the steps in FIG. 15.

Figure 16:
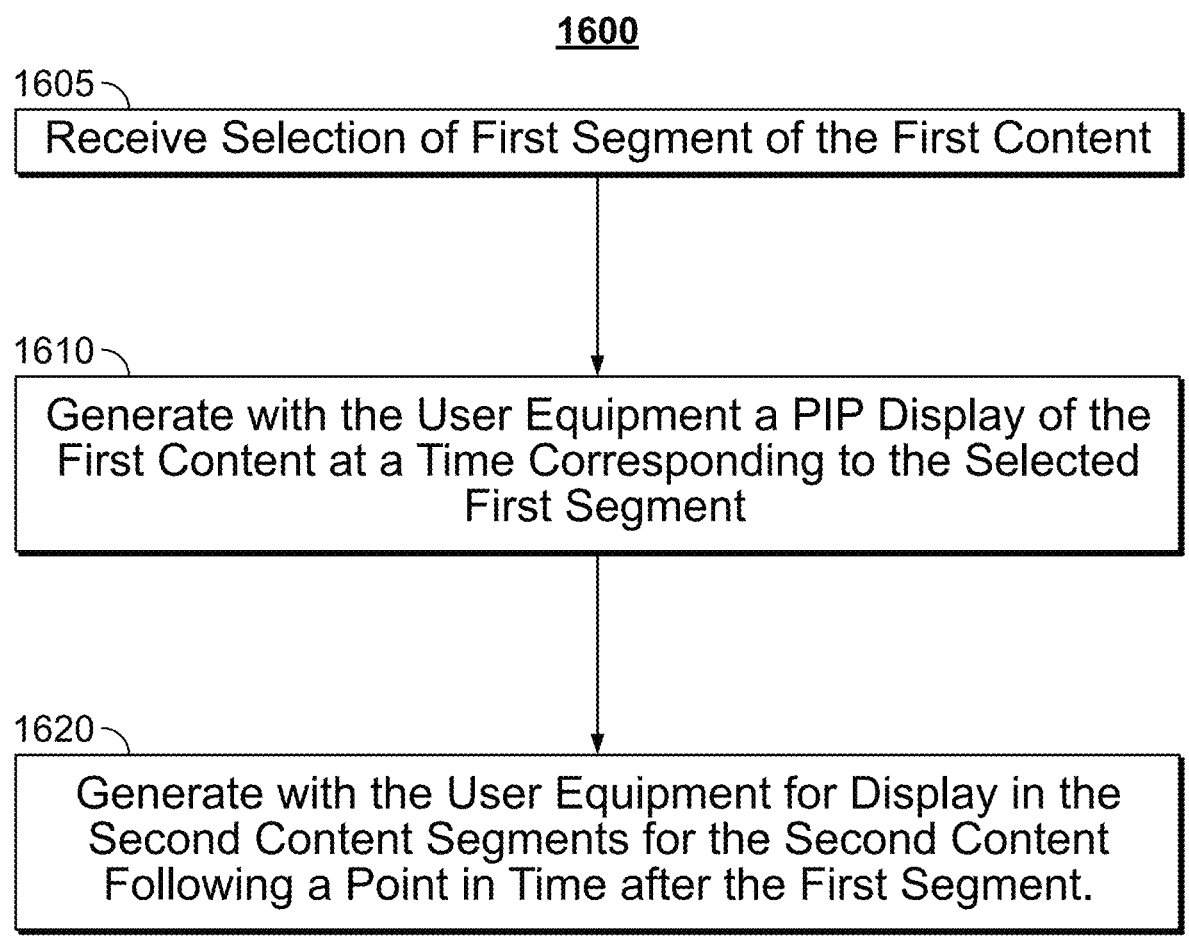

FIG. 16 is a flowchart of illustrative steps of a process 1600 for generating a second progress bar for second content in accordance with some embodiments of the disclosure. It should be noted that process 1600 or any step thereof could be performed on, or provided by, any of the devices shown in FIGS. 10-11. For example, process 1600 may be executed by control circuitry 1004 (FIG. 10) as instructed by a media guidance application implemented on a user device (e.g., user equipment devices 1102, 1104, and/or 1106 (FIG. 11)) in to present a progress bar of information related to previously accessed content order to simulate a sporting event. In addition, one or more steps of process 1600 may be incorporated into or combined with one or more steps of any other process or embodiment described herein.

FIG. 16 depicts an illustrative process 1600 that may be used to generate a second progress bar for a second content item. In the example where a viewer has watched a basketball game and then changed to accessing a television program, if the viewer selects to access a segment from the basketball game, the media guidance application may generate a display that includes the selected segment and also a second progress bar that includes event information for the television program.

At step 1605, control circuitry 1004 for the media guidance application may receive a selection of first segment of the first content. In a display of a television program that includes a progress bar of previously watched content, a viewer may select a segment from the progress bar to obtain actions that can be performed by the media guidance application. For example, a television program display may include a progress bar for a basketball game that the viewer was previously watching. The progress bar may include one or more segments relating to events that have occurred since the viewer stopped accessing the basketball game. When the viewer selects one of the segments, the media guidance application may generate an action or options window in which the viewer may enter a selection for an action associated with the segment. The selection of the segment may be received by control circuitry 1004 for the media guidance application and the media guidance application may determine a source and time associated with the segment so that the media guidance application can perform the needed action.

At step 1610, the control circuitry 1004 for the media guidance application may generate with the user equipment a picture-in-picture display associated with the selected segment. In particular, the control circuitry 1004 for the media guidance application may determine a timestamp associated with the segment and identify the relevant portion of the first content, i.e., the basketball game, to display in the picture-in-picture display. The segment content may be obtained by the control circuitry 1004 for the media guidance application from the original media source used to access the first content, or from another media source if suitable and available.

Since the addition of the picture-in-picture display associated with the selected segment may distract the user from the television program they were viewing, the media guidance application may monitor metadata for the television program to identify segments that can be included in a second progress bar for the second content, i.e., the television program the viewer changed to watch. At step 1620, the control circuitry 1004 for the media guidance application may generate with the user equipment for display in the second content segments for the second content following a point in time after the first segment. The second progress bar will include segments for the second content that follow the time associated with accessing the selected segment for the previously watched content. For example, when the viewer selects a segment to watch a play from the basketball game they previously accessed, the media guidance application may identify segments from the television program to include in a second progress bar that have a timestamp following the time the basketball segment was selected. In some scenarios, a time buffer of a short period slightly before the selection time may be added so that events that occurred slightly before the time of the selection could be included in case the viewer was distracted by the basketball game progress bar and missed something in the television program.

It is contemplated that the steps or descriptions of FIG. 16 may be used with any other embodiment of this disclosure. In addition, the steps and descriptions described in relation to FIG. 16 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 10-11 could be used to perform one or more of the steps in FIG. 16.

Figure 17:
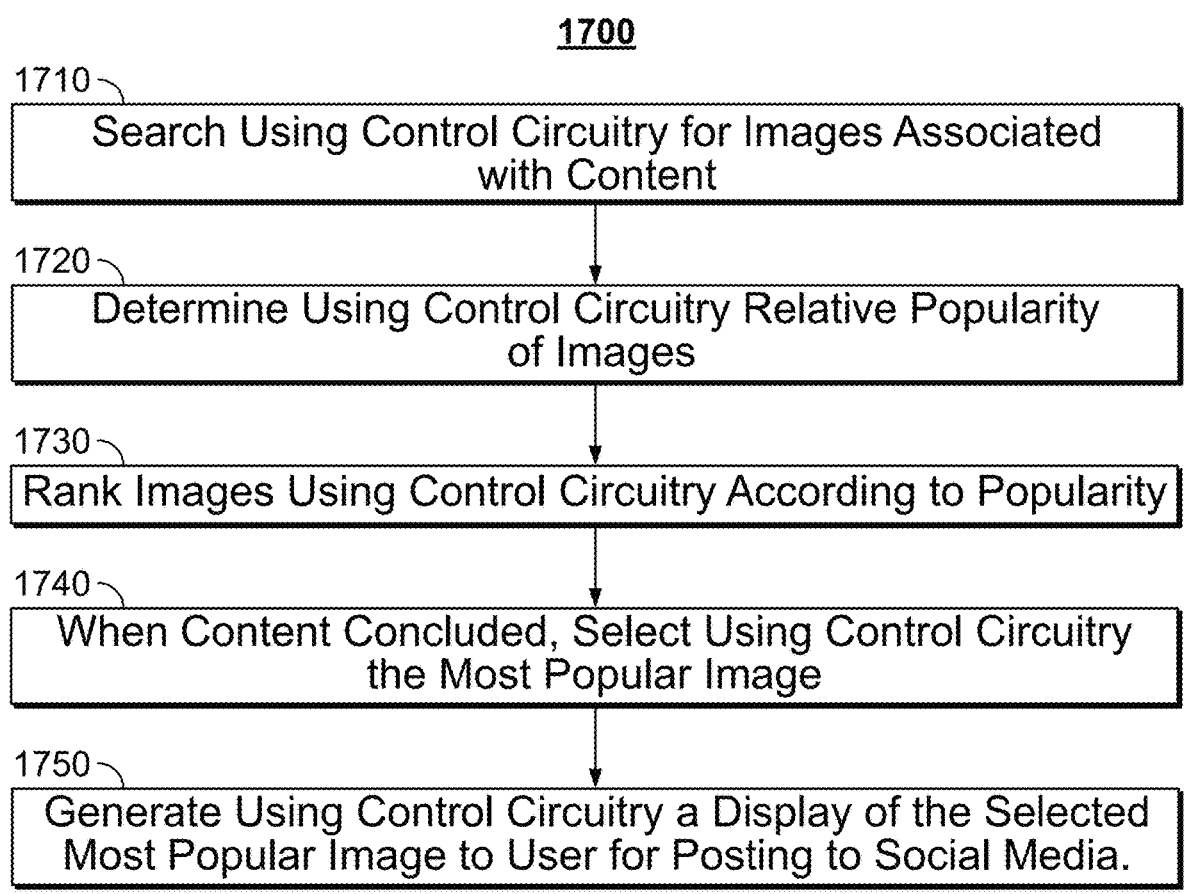
FIG. 17 is a flowchart of an illustrative process for selecting an image related to media content for a viewer in accordance with some embodiments of the disclosure.

FIG. 17 is a flowchart of illustrative steps of a process 1700 for selecting images related to the accessed content for sharing on social media in accordance with some embodiments of the disclosure. It should be noted that process 1700 or any step thereof could be performed on, or provided by, any of the devices shown in FIGS. 10-11. For example, process 1700 may be executed by control circuitry 1004 (FIG. 10) as instructed by a media guidance application implemented on a user device (e.g., user equipment devices 1102, 1104, and/or 1106 (FIG. 11)) to present an image associated with the content. In addition, one or more steps of process 1700 may be incorporated into or combined with one or more steps of any other process or embodiment described herein.

FIG. 17 depicts an illustrative process 1700 for supplying an image to a viewer associated with content. The image may be presented to the user following the conclusion of the content and made available to use for posting on social media. In some scenarios, text about the content and/or image may also be supplied by a media guidance application to facilitate posting about the content on social media.

At step 1710, control circuitry 1004 for the media guidance application may search for images associated with content. In the example of the described in connection with FIGS. 3-7, a viewer may watch an episode of a reality television series Survivor. Then the viewer may begin watching another television series episode for the Simpsons. When access to the Simpsons has been concluded, i.e., when the viewer has finished viewing the Simpsons, the media guidance application may search for images associated with the Simpsons. In some examples, the media guidance application may focus on images associated with the episode that was accessed. The media guidance application may search for Simpsons images in metadata associated with the media content, or by searching a database of images or a media database of images for the show.

Since there may be numerous images associated with the show, the media guidance application may select a particular one (or more) of the images for the user. At step 1720, the control circuitry 1004 for the media guidance application will determine a relative popularity of the images. The image popularity may be determined by use and availability of the image. For example, the media guidance application may detect that a particular image is used in a number of places. In another example, the media guidance application may detect that another image is available from a number of sources. The media guidance application may search social media networks for the user, or generally available social media networks, to identify images used in association with media content. Any instance of these exemplary uses of an image may be used alone or in combination to designate a relative popularity of the image. Certain sources and use types may have a particular importance weight that can also be used to determine popularity. For example, some media sources or third-party commentators may be more influential or popular than others.

Based on the relative popularity of the images, at step 1730, the control circuitry 1004 for the media guidance application may rank the images. The ranking may be based on the relative popularity and include weighting the different factors, e.g., the uses and sources for the image.

When the content that the viewer has accessed concludes at step 1740, the control circuitry 1004 for the media guidance application may select the most popular image for the content to present to the viewer.

The control circuitry 1004 for the media guidance application may generate for display at step 1750 the selected most popular image for the user to select to post on social media. The media guidance application may receive a selection by the user and can send the image to any linked social media accounts so that the user can easily post the image.

In some scenarios, the media guidance application will also search for commentary to include with the social media posting and provide such commentary to the viewer to choose. In some examples, the commentary can be canned and related finishing any type of content, such as "I just binged the season" or more relevant to a series, "I just binged season 26 of the Simpsons!" In another example, the commentary can be searched and collected from media databases and third-party media sources for text that is commonly associated with the content. For example, "I was voted off the island" for finishing Survivor content, or "D'oh!" for finishing a Simpsons episode.

Process 1700 may also be followed upon conclusion of accessing a segment from a progress bar for the first content that the viewer had previously viewed. For example, if the viewer selects to view a clip of Survivor where Bob drops a ball, or the viewer selects to view a clip of a three-point shot in the basketball game, the media guidance application may present a suitable image related to the segment for the viewer to share on social media.

It is contemplated that the steps or descriptions of FIG. 17 may be used with any other embodiment of this disclosure. In addition, the steps and descriptions described in relation to FIG. 17 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 10-11 could be used to perform one or more of the steps in FIG. 17.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
causing to display a first content item on a screen of a display device;
receiving a command to display a second content item on the screen of the display device after the first content item on the screen of the display device is displayed;
in response to receiving the command to display the second content item on the screen of the display device, cause to display, simultaneously with the second content item, a navigable, ordered list of events from the first content item on at least a portion of the screen of the display device; and
in response to selection of an event of the navigable, ordered list, performing an action associated with the first content item.

2. The method of claim 1, wherein the action is at least one of recording, storing, watching, resuming, accessing a link, accessing a highlight, accessing a clip, adding a link, adding an item to a watch list, or sharing a link to social media.

3. The method of claim 1, wherein the first content item includes live event content.

4. The method of claim 3 comprising updating the navigable, ordered list in real time.

5. The method of claim 4, wherein:
the first content item includes sporting event content; and
the navigable, ordered list includes at least one of a game clock indicator, a score indicator, a game event indicator, a penalty indicator, a pause indicator, a break indicator, an injury indicator, a player in indicator, a player out indicator, or a player name indicator.

6. The method of claim 4, wherein:
the first content item includes reality show content; and
the navigable, ordered list includes at least one of a segment indicator, a pause indicator, a break indicator, a challenge indicator, a vote indicator, or a meeting indicator.

7. The method of claim 1 comprising, after the causing to display the second content item, performing at least one of:
delaying the displaying each event of the navigable, ordered list until detecting occurrence of the event in the first content item, wherein the detecting of the occurrence of the event in the first content item includes at least one of:
determining a relevance of each sequential event from the first content item; or
comparing each sequential event from the first content item with a profile of a user; or
displaying minimal information associated with the first content item.

8. The method of claim 3 comprising, after switching from displaying the first content item to the displaying of the second content item, the displaying of the navigable, ordered list only includes information that occurs in the first content item since the switching.

9. The method of claim 1 comprising, at least one of:
moving a position of the navigable, ordered list;
changing a size of the navigable, ordered list;
decreasing an amount of information included in the navigable, ordered list; or
increasing an amount of information included in the navigable, ordered list.

10. The method of claim 1 comprising, displaying a second navigable, ordered list associated with the second content item while displaying the navigable, ordered list.

11. The method of claim 1 comprising:
recording or storing the first content item;
accessing metadata associated with the first content item; and
populating the navigable, ordered list based on the accessed metadata.

12. A system comprising:
memory; and
control circuitry configured to:
cause to display a first content item on a screen of a display device, the first content item stored in the memory;
receive a command to display a second content item on the screen of the display device after the first content item on the screen of the display device is displayed;
in response to receiving the command to display the second content item on the screen of the display device, cause to display, simultaneously with the second content item, a navigable, ordered list of events from the first content item on at least a portion of the screen of the display device; and
in response to selection of an event of the navigable, ordered list, perform an action associated with the first content item.

13. The system of claim 12, wherein the action is at least one of recording, storing, watching, resuming, accessing a link, accessing a highlight, accessing a clip, adding a link, adding an item to a watch list, or sharing a link to social media.

14. The system of claim 12, wherein the first content item includes live event content.

15. The system of claim 14, the control circuitry configured to update the navigable, ordered list in real time.

16. The system of claim 15,
wherein the first content item includes sporting event content, and
wherein the navigable, ordered list includes at least one of a game clock indicator, a score indicator, a game event indicator, a penalty indicator, a pause indicator, a break indicator, an injury indicator, a player in indicator, a player out indicator, or a player name indicator.

17. The system of claim 15,
wherein the first content item includes reality show content, and
wherein the navigable, ordered list includes at least one of a segment indicator, a pause indicator, a break indicator, a challenge indicator, a vote indicator, or a meeting indicator.

18. The system of claim 12, the control circuitry configured to, after causing to display the second content item, performing at least one of:
delay the displaying each event of the navigable, ordered list until detecting occurrence of the event in the first content item, wherein the detecting of the occurrence of the event in the first content item includes at least one of:
determine a relevance of each sequential event from the first content item; or
compare each sequential event from the first content item with a profile of a user; or
display minimal information associated with the first content item.

19. The system of claim 14, the control circuitry configured to, after switching from displaying the first content item to the displaying of the second content item, the displaying of the navigable, ordered list only includes information that occurs in the first content item since the switching.

20. The system of claim 12, the control circuitry configured to perform at least one of:
   move a position of the navigable, ordered list;
   change a size of the navigable, ordered list;
   decrease an amount of information included in the navigable, ordered list; or
   increase an amount of information included in the navigable, ordered list.

21. The system of claim 12, the control circuitry configured to display a second navigable, ordered list associated with the second content item while displaying the navigable, ordered list.

22. The system of claim 12, the control circuitry configured to:
   record or store the first content item;
   access metadata associated with the first content item; and
   populate the navigable, ordered list based on the accessed metadata.

23. The method of claim 1, wherein events in the navigable, ordered list of events start at or after a time at which the command to display a second content item is received.

24. The system of claim 12, wherein events in the navigable, ordered list of events start at or after a time at which the command to display a second content item is received.

* * * * *